United States Patent
Murasaki et al.

[11] Patent Number: 5,867,158
[45] Date of Patent: Feb. 2, 1999

[54] DATA PROCESSING APPARATUS FOR SCROLLING A DISPLAY IMAGE BY DESIGNATING A POINT WITHIN THE VISUAL DISPLAY REGION

[75] Inventors: Yasushi Murasaki, Soraku-gun, Japan; Yoshiro Kihara, Hamburg, Germany

[73] Assignee: Sharp Kabushiki Kaisha, Osaka, Japan

[21] Appl. No.: 708,053

[22] Filed: Aug. 30, 1996

[30] Foreign Application Priority Data

Aug. 31, 1995 [JP] Japan .................................. 7-224187

[51] Int. Cl.$^6$ .................................................. G06F 3/033
[52] U.S. Cl. ........................................... 345/341; 345/123
[58] Field of Search .................................. 345/341, 342, 345/340, 339, 326, 121, 123, 124, 125, 145, 157, 973

[56] References Cited

U.S. PATENT DOCUMENTS

| | | | |
|---|---|---|---|
| 4,831,556 | 5/1989 | Oono ........................................ | 345/341 |
| 5,196,838 | 3/1993 | Meier et al. ............................. | 345/118 |
| 5,305,435 | 4/1994 | Bronson ................................... | 345/351 |
| 5,333,247 | 7/1994 | Gest et al. ............................... | 345/438 |
| 5,384,909 | 1/1995 | Brown ...................................... | 345/341 |
| 5,404,442 | 4/1995 | Foster et al. ............................. | 345/348 |
| 5,493,641 | 2/1996 | Brown ...................................... | 345/341 |
| 5,495,566 | 2/1996 | Kwatinetz ................................ | 345/341 |
| 5,528,260 | 6/1996 | Kent ........................................ | 345/123 |
| 5,611,060 | 3/1997 | Belfiore et al. .......................... | 345/341 |
| 5,655,094 | 8/1997 | Cline et al. .............................. | 345/341 |
| 5,726,687 | 3/1998 | Belifore et al. .......................... | 345/341 |

FOREIGN PATENT DOCUMENTS

| | | |
|---|---|---|
| 0632362 | 4/1995 | European Pat. Off. . |
| 617914 | 6/1984 | Japan . |
| 63-102461 | 5/1988 | Japan . |
| 594504 | 4/1993 | Japan . |

*Primary Examiner*—Matthew M. Kim
*Assistant Examiner*—Crescelle N. dela Torre

[57] ABSTRACT

The present invention is directed to setting the direction and the quantity of movement by a point and to execute scrolling. A reference point is set in the display screen of the display apparatus of the electric device, in advance. When a user selects a display mode of a data processing function and designates a point within the display screen through a coordinate inputting apparatus, the device calculates a positional deviation of a designate point from the reference point as a deviation of a coordinate value, switches a display image so that an image component which is displayed at a position corresponding to the designate position is located at a position corresponding to the reference position, and scrolls the image. Further, when a point is designated successively a plurality of times as a designation point, an image which is sequentially switched is scrolled the plurality of times at predetermined time intervals. Still further, when designating is successively executed for a plurality of times, the predetermined time is shortened in accordance with the number of designating. When a display image includes a character, an approximate value of a deviation which denotes a positional deviation is found among integer-multiples of the width of a rectangular region which includes the character.

23 Claims, 24 Drawing Sheets

*FIG. 5A*     *FIG. 5B*     *FIG. 5C*
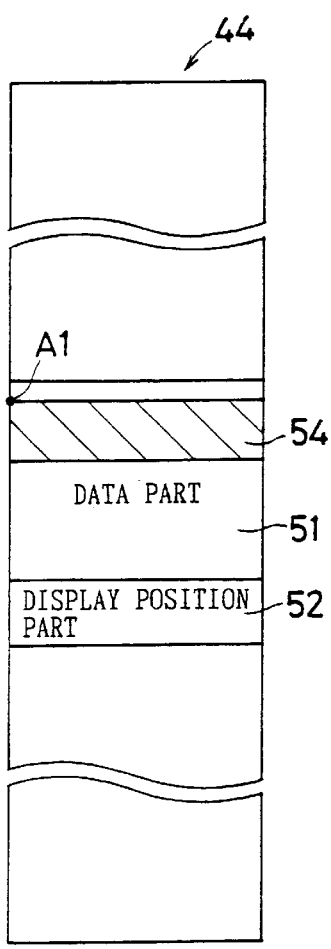
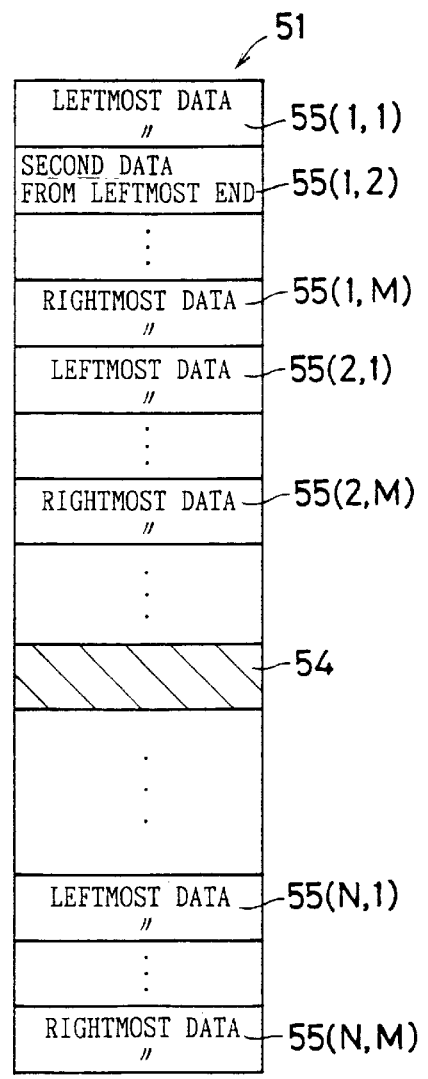
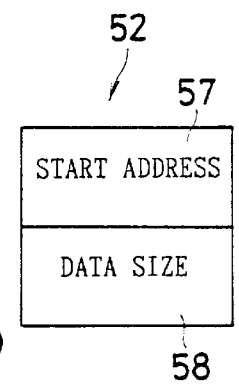

DATA PROCESSING APPARATUS FOR SCROLLING A DISPLAY IMAGE BY DESIGNATING A POINT WITHIN THE VISUAL DISPLAY REGION

BACKGROUND OF THE INVENTION

1. Field of the Invention

The present invention relates to a data processing apparatus which is applicable to personal computers, small electric devices, etc., and which has a function of converting data into an image which can be visually displayed for visual display.

2. Description of Related Art

In application software used in a personal computer and in a small portable electric device called "electric scheduler," created data are visually displayed as an image in a display screen of displaying means of the device. A user looks at the image which is obtained by visualizing the data and grasps the contents of the data.

When the created data have a large quantity, at least one size of the image visualizing the data may become wider than the size of the display screen of a display apparatus in the same direction as that of the one size. A small electric device, in particular, has a small display screen, and therefore, the width of the image of the data becomes larger than the width of the display screen in many cases. For example, when data created on a personal computer or other machine are to be transmitted to and visually displayed in a small electric device, the size of an image of the data becomes larger than that of a display screen. Data to be transmitted may be a log of communications on a personal computer. In addition, when a map used in a navigation machine is to be visualized into an image and visually displayed in a small electric device, an image of the map becomes larger than the size of a display screen.

In some cases, in a small electric device, a display screen of a display apparatus is small and the quantity of data which can be visually displayed at a time in the display screen is small. For instance, the number of characters which can be visually displayed in a display screen may be smaller than in other machines. Hence, the size of an image of data often exceeds the size of a display screen, as described above.

When the size of an image of entire data is larger than the size of a display screen, only a portion of the (data is displayed in the display screen. A user may wish to visually display the data of the portion which is not displayed in the display screen, in such a condition. The user, therefore, scrolls the image of the data which is visually displayed in the display screen so that an image of the data which is not displayed is visually displayed in the display screen. Scrolling is not limited to an action of sequentially moving an image little by little in a direction which is specified by a user, but also includes an action of switching an image to another image.

A first conventional technique to instruct scrolling is related to an apparatus which instructs scrolling of an image by means of manipulation of a cursor key. A cursor key is on keyboard, for instance. Alternatively, a cursor key is set as-a visually displayed image which is displayed in a display screen. The cursor key is manipulated by clicking a mouse. "Clicking of a mouse" is an action in which a button of the mouse is operated with a cursor which follows the mouse located at the same display position as a predetermined image which is to be clicked within a display screen. A predetermined image is a character, for instance.

FIG. 28 is a diagram showing a display image 3 which includes an image 1, which is visually displayed data, and a cursor key 2. When data are visually displayed, such a display image 3 is displayed in a display screen of displaying data of a small electric device and a display screen of a display apparatus of a personal computer. The image 1 is obtained by visualizing a portion of data to be visually displayed into an image. The cursor key 2 is a virtual image including the image 1, and serves as a key for scrolling a virtual image which is obtained by visualizing the entire data to be visually displayed into an image. The cursor key 2 includes a left-hand direction key 2a, a right-hand direction key 2b, a forward direction key 2c, and a backward direction key 2d. The forward/backward direction is perpendicular to the right/left direction but is parallel to the display screen. For example, when the backward direction key 2d is operated only once, a display image 4 of FIG. 29 is displayed in the display screen instead of the display image 3 of FIG. 28.

An image 1a which is included in the display image 4 is an image which is obtained by scrolling the image 1 of the display image 3 one line in the forward direction. In the image 1a, an image 5 which used to be in a line which is displayed in the most forward portion of the image 1 is deleted, and instead, an image 6 of a new line is added to the most backward portion of the image. This line image 6 is an image which is included in the virtual image of the entire data, i.e., the image which used to be behind the image 1 within the virtual image. Thus, by manipulating the cursor key 2, the display image which is displayed in the display screen is changed and the data are sequentially visually displayed.

Further, in addition to a cursor key, as means for instructing scrolling, an designation area called "scroll bar" is set within the displayed screen in some cases. FIG. 30 is a diagram of a display image 7 which includes the designation area. The display image 7 includes images of designation areas 9, 10, in addition to an image 8 for visually displaying data within the display screen. In the designation areas 9, 10, the cursor key 2 described above is also set in some cases.

The designation areas 9, 10 are set along the direction of scrolling the image 8. The designation area 9 is an area for instructing scrolling of the image 8 in the forward/backward directions. The designation area 10 is an area for instructing scrolling of the image 8 in the right/left directions. A user clicks the cursor key 2 with a mouse, for instance, so that the image 8 is scrolled by a predetermined quantity of movement. In addition, when characters 9a, 10a set within the designation areas 9, 10 are clicked using the mouse while moving the mouse, the positions of the characters 9a, 10a within the designation areas 9, 10 are moved. As the characters 9a, 10a are moved, the image 8 is scrolled by the quantity the characters 9a, 10a are moved.

In this conventional apparatus, when instructing scrolling of an image, a user looks at the images 1, 8 which are displayed in the display screen, and determines tow much scrolling of the images 1, 8 is necessary in which direction in order to visually display data which are not visually displayed in the display screen. Next, the user looks at the cursor key 2 and the designation areas 9, 10 which are located in an area other than the area in which the images 1, 8 are displayed within the display screen. Following this, the user operates the cursor key 2 and the designation areas 9, 10 which are found, in a necessary direction by a necessary quantity, so that the images 1, 8 are scrolled. In this manner, this apparatus requires a user to determine a number of points before instructing scrolling, and therefore, quick operation for scrolling is difficult.

Further, in this apparatus, when scrolling is instructed, a direction which can be designated with one instruction is limited to a predetermined move direction. For example, when the cursor key 2 and the designation areas 9, 10 shown in FIGS. 28 to 30 are used to instruct scrolling, a move direction in which an image can be scrolled is limited to either one of two directions orthogonal to each other, i.e., the forward/backward direction and the right/left direction.

Therefore, when an image is to be scrolled in a diagonal direction which intersects both two directions, the image is scrolled in one of the forward/backward direction and the right/left direction first, and is then scrolled in the other one of the forward/backward direction and the right/left direction. For this reason, a user must re-evaluate the scroll quantity which is judged during instructing earlier into the move quantity in each one of the forward/backward direction and the right/left direction, and individually instruct the scroll quantity and the move quantity in each direction.

Further, when scrolling is instructed using the cursor key 2, the quantity an image moves in accordance with one instruction is kept to a constant quantity. Hence, to scroll an image by a necessary quantity of movement, it is necessary to repeat the same instruction which uses the cursor key 2, a plurality of times. Such an operation is a so-called digital operation, and therefore, does not always coincide with an analog-like operation which a user expects, such as to move an image in a diagonal direction by a desired quantity.

In addition, a display screen of displaying data of a small electric device, i.e., one example of the apparatus according to the present invention, is smaller than a personal computer. When the display image 7 is visually displayed in this device, the sizes of the designation areas 9, 10 become extremely smaller than when the display image 7 is visually displayed in a display apparatus of a personal computer. It is difficult to operate the scroll bars of the small designation areas 9, 10 to give an instruction of scrolling. With a small electric device in which inputting means is formed by overlaying a tablet on a display screen, in particular, it is difficult to accurately operate the tablet which is located at a position corresponding to a small scroll bar. Moreover, in the apparatus according to the present invention, since a tablet which is as large as or larger than the images 1, 8 is necessary, the tablet tends to be large. This makes it difficult to decrease the size of the product.

A second conventional technique related to scrolling of an image is disclosed in Japanese Unexamined Patent Publication JP-A 5-94504 (1993). In an electric image processing apparatus disclosed in the publication, a digital tablet having a wider area than a display screen is set on the display screen as inputting means. A user designates a point within the area of the tablet, using a pen. For instance, the user moves the pen, from an area immediately above the display screen within the tablet toward an area which is in a peripheral portion of the display screen within the tablet but is outside the area which is located immediately above. When the pen arrives at the tablet in the peripheral portion of the display screen, a predetermined operation is executed on a displayed image, in accordance with the direction in which the pen moves.

If the direction in which the pen moves within the area of the tablet is a left-hand direction which extends from an area on the display screen toward a left-hand side peripheral portion of the area of the peripheral portion of the display screen, data which are displayed as an image are replaced. If the direction in which the pen moves is a right-hand direction, an image is scrolled. If the direction in which the pen moves is a backward direction, an image is expanded. If the direction in which the pen moves is a forward direction, this operation is ended and switched to a menu screen. Further, when instructed scrolling is executed, the speed an image is scrolled is determined in accordance with the pressure with which the tablet is pressed down with the pen during instructing.

In this electric image processing apparatus, after scrolling of an image is instructed, it is necessary to designate the direction and the quantity of scrolling once again, which is complex. In addition, in this apparatus, since a tablet which is equal to or larger than a display screen is needed, the tablet is large. This makes it difficult to decrease the size of the product.

The applicant of the present application has also proposed a technique for easily instructing scrolling, in Japanese Unexamined Patent Publication JP-A 63-102461(1988). In an electric file apparatus of the publication, a tablet is set on a display screen of a CRT, as inputting means. In the display screen, a rectangular display region for visually displaying data is set to have a size smaller than the display screen. In the display region, an image visually showing a portion of data which are to be displayed is displayed. In an external peripheral portion of the display region, scroll designation areas are set. One scroll designation area is set in a peripheral portion of each side of the display region.

When a user wishes to newly visually display data other than the currently visually displayed portion of the data which are to be displayed, within a virtual image which virtually shows the entire data to be displayed as an image, the user operates a tablet which is in a portion which corresponds to the scroll designation area which is set in the same direction as a direction in which an image of the desired portion of the data exists as viewed from the image of the currently visually displayed portion of the data, so that scrolling of an image is instructed. For instance, when a tablet corresponding to the designation area which is set on the right-hand side of the display region is operated, the image which is displayed in the display region is scrolled in a direction from the right-hand side to the left-hand side.

Further, the applicant of the present application has proposed a technique for constantly displaying an operation designation area called "icon," in Japanese Unexamined Patent Publication JP-A 61-7914 (1986). An icon is displayed as an image within a display screen. In the display apparatus of the publication, icons are printed and displayed on a transparent acrylic plate which is disposed over a display screen. A tablet which serves as an inputting unit is larger than the display screen, and has an area which is about the same as the size of the transparent acrylic plate. To designate an icon, a tablet which is in a portion which corresponds to the portion of the icon on the transparent acrylic plate is to be operated. When the tablet in this portion is operated, the apparatus performs an operation which corresponds to the icon.

In addition, in some of recent personal computers and portable small electric devices, an operation called "dragging" is performed. To perform dragging, a user executes pointing by pressing down a tablet which corresponds to a desired position within a display image, with a pen, for instance, and moves the pen without lifting up the pen. Alternatively, a user executes pointing by clicking a mouse at a desired position within the image, and moves the mouse. As a result of such an operation, an image which is displayed within the display screen moves as the pen and the mouse move. Dragging is often used when a plurality of window images overlap with each other in an apparatus which performs so-called window displaying, in order to move the window images. Dragging is an operation to move only an image within a display image, and therefore, it is difficult to move an image beyond the display image.

SUMMARY OF THE INVENTION

An object of the present invention is to provide a data processing apparatus in which it is easy to instruct scrolling of an image, and a direction and quantity of the scrolling of the image.

The present invention provides a data processing apparatus including a memory for storing data of an image to be visually displayed;

a displaying unit including a visual display region for visually displaying the image data stored in the memory, the visual display region being smaller than a virtual visual display region of the image data and at least partially overlapping the virtual display region;

a designating unit for designating one point within the visual display region of the displaying means as a designate position;

a computing unit for calculating a positional deviation of the designate position designated by the designating units from a reference position predetermined within the visual display region, in response to an output from the designating unit; and image moving unit for scrolling the data of the image which is displayed in the visual display region in response to an output from the computing unit so that the positional deviation is almost eliminated and for having the displaying unit display the image in the visual display region.

According to the present invention, the data processing apparatus is an apparatus in which the image data which are stored in the memory are visualized into an image and displayed in the displaying unit. In the memory, the image data of an image to be visually displayed are stored as data in such a format that the data can be displayed in the visual display region of the displaying unit.

A width in at least one direction of the virtual visual display region which is needed to display a virtual image which is obtained by visualizing the entire image data of the memory into an image at once is wider than that of the visual display region of the displaying unit. Hence, when the image data are to be visually displayed in the visual display region, only a partial image portion of the virtual image is displayed as a display image in the visual display region, but the remaining image portion outside this area is not displayed. A user of the data processing apparatus scrolls the display image, when wishing to visually display the remaining image portion.

Scrolling is an operation of sequentially changing and moving a displayed image portion of a virtual image to change data which are visually displayed in the visual display region. When scrolling is instructed, for instance, the apparatus moves the display image from the original display position of the display image. Next, the image of the portion outside the visual display region of the display image is erased from the display image. Following this, an image portion, which is as large as the erased portion and is displayed at a position facing the erased portion within the virtual image with the center of figure of the displayed image portion which is displayed as the display images in-between, is added to a position facing the erased portion of the display image. As a result, the position of the image portion which is displayed as the display image within the virtual image is moved.

Scrolling includes an operation of switching a current display image with a new display image. A new display image may include a portion of the display image which used to be displayed before switching. At this stage, the new display image is formed by locating the portion of the display image at a different position from the original display position within the display image, and by adding an image of the new data to the image portion as the remaining portion of the display image.

When scrolling of an image is instructed in the data processing apparatus of the present invention, a user designates one point within the visual display region of the displaying unit as a designate position. Within the visual display region, one point is set in advance as the reference point. The computing means calculates a positional deviation of the designate position from the reference position, and supplies a result of calculation to the image moving means.

The positional deviation is expressed as a difference in coordinate values along two-dimensional coordinate axes which are set within the visual display region, for example. Alternatively, the positional deviation may be expressed as a distance between the reference position and the designate position which is calculated based on a difference in coordinate values and a direction extending from the designate position to the reference position. Further alternatively, the positional deviation may be expressed as any physical quantity which implies that the reference position and the designate position are displaced from each other and which can be calculated by the computing unit.

The image moving unit changes data displayed within the visual display region, and scrolls an image. At this stage, a display image of the data which are displayed within the visual display region is scrolled so that there is almost no positional deviation. That is, an image component which is drawn within the display image and which is at a position corresponding to the designate position within the display image as shown before it is scrolled is located at a position corresponding to the reference position within the display image as it is after scrolled. Remaining image components other than the image component at the designate position within the display image are arranged to maintain positional relationships with the image portion of the designate position as it is before scrolled. Thus, in the data processing apparatus, only by directly designating one point within the visual display region of the displaying unit, it is possible to designate the direction and the quantity of movement of the display image and to scroll the display image in an easy manner.

For instance, it is assumed that the reference position is the center of the figure in the visual display region, and that an image is to be scrolled so as to visually display the remaining image portion which is displayed in the right/left direction of the display image portion which is currently visually displayed as the display image within the visual display region of the virtual image. In this case, a user designates a point which is in the right/left direction with respect to the reference position within the visual display region, as a designate position. Further, when an image is to be scrolled so as to visually display the remaining image portion of the forward/backward direction, which is perpendicular to the right/left direction, with respect to the display image portion within the visual image, a point in the forward/backward direction with respect to the reference position is designated.

In other words, a point which exists in the same side as an image of data to be visually displayed exists with respect to the reference position is designated. As a result, the original display image is moved in an opposite direction to the position of the image of the data, and data which have not been visualized into an image so far are visually displayed as an image at a position facing an image portion which is erased outside the visual display region with the reference position in-between. Hence, when a user wishes to look at data which are visually displayed on the right-hand side to the display image portion within the virtual image, the user only needs to designate a point on the right-hand side within the visual display region to scroll the image from the right-hand side to the left-hand side. Thus, by directly designating a direction of the data which are to be newly visually displayed, the image is scrolled.

The visual display region is essentially a region for visual display of data and set so as to occupy approximately the entire area of the display screen of the display apparatus. Hence, it is not necessary to set a designation area which is defined separately from an area which displays data within the visual display region, such as a cursor key and a scroll bar which are conventionally used. In addition, since the visual display region is larger than this designation area, it is easy to instruct scrolling as compared with an apparatus in which scrolling is instructed using a designation area.

Further, with one scrolling, an image is scrolled in such a manner that a displacement between image components which are displayed at the designate position and the reference position before scrolling almost disappears. Therefore, as a positional deviation of the designate position from the reference position is larger, the quantity of movement associated with one scrolling is larger. During scrolling to switch a display image, a time which is used for one scrolling of an image remains unchanged regardless of the quantity of movement. In such scrolling, as a positional deviation of the designate position from the reference position is larger, the scrolling speed falsely felt by a user is increased. That is, only by setting a designate position within the visual display region, a user can optionally set not only the direction of scrolling but also the quantity of scrolling.

Thus, a user looks at data which are visualized into an image and visually displayed within the visual display region, determines the direction and the quantity of scrolling, and designates a position which is away from the reference position by the quantity of movement in the direction of movement, whereby scrolling is started in the data processing apparatus according to the present invention. The direction of movement and the quantity of movement as well can be designated by the same instruction which instructs scrolling, as a positional relationship between the reference position and the designate position. This makes it easy to designate a desired movement and quantity of movement. Hence, it is possible to easily and quickly instruct and execute scrolling.

In the present invention, setting of the reference position and designation of the position are conducted by two-dimensional coordinates which are defined by two orthogonal axes which are shown in the visual display region, and the computing unit arithmetically operates the positional deviation of the designate position from the reference position by computing differences in value between the two-dimensional coordinates of the reference position and the designate position corresponding to the respective coordinate axes.

According to the present invention, the reference position and the designate position are set as points on a two-dimensional plane. The respective positions are expressed as coordinates of a two-dimensional orthogonal coordinate system which is set in the visual display region. Coordinates of the two-dimensional orthogonal coordinate system are expressed by two values of X-coordinates and Y-coordinates which correspond to an X-coordinate axis which is parallel to the right/left direction and a Y-coordinate axis which is parallel to the forward/backward direction.

The computing unit calculates a deviation between X-coordinate values of the respective positions and a deviation between Y-coordinate values of the respective positions. A positional deviation of the designate position from the reference position is expressed by combination of deviations of the coordinate values regarding the respective coordinate axes. In other words, the positional deviation is expressed as a vector whose start point is one of the reference position and the designate position and whose end point is the other of the reference position and the designate position. The image moving unit moves the display image portion within the virtual image in the X-direction and the Y-direction by the deviations of the values of the respective coordinates, visually displays this portion as a display image, and scrolls the image.

Thus, in the data processing apparatus, by designating only one position which is expressed by coordinates of a two-dimensional orthogonal coordinate system, it is possible to scroll the image at one time in the two mutually perpendicular directions which are parallel to the respective coordinate axes. That is, it is possible to designate scrolling in a diagonal direction with respect to the coordinate axes. To perform scrolling in a diagonal direction in a conventional data processing apparatus, it is necessary to instruct scrolling individually in two predetermined directions. However, in the data processing apparatus of the invention, scrolling is performed by instructing only once. Hence, a user can execute scrolling by directly designating the direction of desired scrolling. This simplifies scrolling as well as realizes scrolling which matches an analog-like feeling of a user.

In the invention, the image to be visually displayed is an image including a character image, setting of the reference position and designation of the designate position are conducted using two-dimensional coordinates which are defined by two orthogonal coordinate axes which are shown in the visual display region, and the computing unit includes:
  a deviation calculating unit for calculating deviations of the designate position from the reference position in coordinate values corresponding to the respective coordinate axes; and
  an approximate value calculating unit for arithmetically operating positional deviation by calculating approximate values of the deviations as an integer-multiple of widths of a predetermined rectangular region in the coordinate axis directions, the predetermined rectangular region containing the character image.

According to the present invention, the data of the image to be visually displayed, stored in the memory, include at least data for displaying characters. The concept of characters as herein termed includes hiragana characters, katakana characters, Chinese characters, alphabets, figures, symbols, pictographs, etc. The data for displaying characters are expressed using, for example, predetermined codes, which are different from graphic data. Graphic data directly show an image, and are expressed using data which show a vector and a black-and-white display condition of each dot, for instance. Each character, when visually displayed in the visual displaying unit, is expressed as a unit image which is a visually displayed geometric figure which is set in advance corresponding to codes of each character. Image data of the image of each character are stored in the data processing apparatus, separately from the image data which are to be visually displayed, in correspondence to the codes of each character.

To scroll an image of data including a unit image of a character in the data processing apparatus, the deviation calculating unit computes differences in value between the two-dimensional coordinates of the reference position and the designate position corresponding to the respective coordinate axes. Following this, the approximate value calculating unit calculates approximate values of the deviations for each one of the coordinate axis directions.

The approximate values of the deviations are obtained by multiplying widths of a predetermined rectangular region in the coordinate axis directions by an integer. The rectangular region includes a display region having a minimum necessary size to display a unit image of a character. The size of the rectangular region is determined considering an interval between adjacent display regions, when the character is displayed by arranging the display regions in the form of a matrix. The approximate values of the deviations are values which are closest to the deviations among the integer-multiples of the widths of the rectangular region. Thus, when an image which includes a number of unit images which are visually displayed geometric figures having a predetermined size of a character is scrolled, if a point within the unit images is designated, a positional deviation of the designate position from the reference position is approximated to a deviation between the reference position and a predetermined position which is set within the unit images.

Due to this, when different points within the same rectangular region are designated, images are scrolled in the same direction and by the same distance. That is, even when designate positions are displaced within the range of the rectangular region, scrolling by the same quantity in the same direction is performed. This makes it possible to scroll in units of the rectangular region. For instance, it is possible to scroll row by row or column by column in the form of a matrix. Hence, the operability of the apparatus is improved.

By scrolling in the manner mentioned above, an arrangement of unit images in relation to the visual display region after scrolling always coincides with that before scrolling. Hence, when the visual display region has a size which is an integer-multiple of the rectangular region, it is possible to prevent such scrolling that a portion of the image of a character is moved outside the visual display region in the vicinity of a boundary of the visual display region.

In the invention the data processing apparatus further includes a data inputting unit for storing data which are inputted on the basis of a designated position within the visual display region into the memory; a mode switching unit for selectively switching and setting a display mode which allows scrolling of an image and an inputting mode which allows input of data; and a control unit for supplying a designate position from the designating unit to the computing unit and causing the computing means to calculate the positional deviation when the display mode is set, the control unit causing the inputting means to input data based on the designated position within the visual display region when the inputting mode is set.

According to the present invention, the data processing apparatus not only visually displays the data which are stored in the memory but also supplies and stores data which are to be visually displayed into the memory. When data which are to be visually displayed are inputted, a user designates an optional position within the visual display region of the displaying unit, using the data inputting unit. This data are inputted based on the designated optional position.

The data inputting unit is formed by combining a tablet and a display apparatus, for example. A use designates a position within the visual display region which corresponds to a display position of the selected data within the image, using the tablet. Judging that the data at the display position within the image which corresponds to the position within the visual display region are inputted, the data inputting unit stores the data in the memory. Further, when a plurality of positions are designated successively by the tablet, data determined on the basis of the plurality of positions can be obtained as data to be inputted.

Designation of a position for inputting data and designation of a position for scrolling are both executed within the visual display region. When the tablet above is the same as the designating unit, for instructing a position within the visual display region, for example, it is necessary to judge whether an instruction of the position in accordance with the tablet is an instruction for inputting data or for scrolling. In the data processing apparatus, the mode switching unit switches the display mode and the inputting mode, so that whether the instruction is for inputting or scrolling is judged depending on the mode. For instance, when the display mode is selected, the instruction of the position is judged to be for scrolling. When the inputting mode is selected, the instruction of the position is judged to be for inputting data.

In this manner, the data processing apparatus have the inputting mode and the display mode. By selecting the inputting mode, it is possible to input and correct data in the data processing apparatus. Hence, in an apparatus for creating and correcting data, e.g., a word processor and graphic software, such scrolling can be executed. Further, since the data inputting unit and a portion of the designating unit are the same, it is possible to reduce the number of parts of the data processing apparatus.

In the invention the designating unit can continuously designate designate positions, and the data processing apparatus further includes a judging unit for judging whether a position is designated by the designating unit, at predetermined time intervals; and a control unit for supplying an output from the designating unit to the computing unit when the judging unit judges that a position is designated, in response to the output from the designating unit.

According to the present invention, the designating unit of the data processing apparatus can continuously designate positions. When the designating unit includes a tablet, for instance, a user successively designates a position by continuously pressing down a portion of the tablet which is at a position corresponding to a predetermined position within the visual display region.

In the data processing apparatus, the judging unit judges whether a position is designated, at predetermined time intervals. For example, whether the tablet is pressed down is detected every predetermined time. Hence, not only when a condition where the tablet is not pressed down is switched to a condition where the tablet is pressed down but also while the tablet remains pressed down, it is judged that instruction of scrolling is provided.

When a certain point within the visual display region is kept designated, an image is scrolled so that an image component corresponding to the designate position is displayed at the reference position. Following this, an image component which now corresponds to the designate position as a result of scrolling is scrolled to the reference position. In this manner, only one instruction allows sequential scrolling which sequentially repeats the scrolling to be performed. Hence, it is easy to execute large scale scrolling beyond the size of the visual display region. This further improves the operability of the apparatus.

In the invention, the judging unit, when successively judging a plurality of times that the designate position is designated, shortens the predetermined time every time a position is designated.

According to the present invention, when sequential scrolling described above is executed, depending on the times of sequential scrolling, the judging unit shortens the predetermined time at which whether designation of a position is conducted is judged. As a result, when sequential scrolling is executed, as the times of sequential scrolling are larger, the speed of scrolling increases. For instance, during large scale scrolling such as scrolling from an end of a virtual image of the entire data to the opposite side end, it is possible to gradually increase the speed of scrolling. Hence, when an image of a large quantity of data is scrolled, a time required for scrolling is shortened as compared with the case where the predetermined time is constant.

In the invention the data processing apparatus further including a reference position setting unit for changing and setting the reference position to one point which is designated within the visual display region of the displaying unit.

According to the present invention, as far as the reference position is a position within the visual display region, using the reference position setting unit, a user can optionally change and set the reference position. Hence, in scrolling within a display region which is a so-called window which is smaller than a displayable region of the displaying unit as the visual display region, in the data processing apparatus, it is possible to set the reference position for scrolling of an image, corresponding to the display position of the window within the displayable region. This is applicable particularly when the display position of the window is determined at a predetermined position within the displayable region of the displaying unit or to other cases.

Further, when the scroll direction is always determined, even if it becomes necessary to scroll so that a virtual image of the entire data is displayed sequentially from one end to the other end of the virtual image, a user can control the scroll direction for scrolling the image by changing the reference position to a vicinity of an end of the visual display region. This further improves the operability of scrolling.

In the invention, the reference position is the center of figure of the visual display region of the displaying unit.

According to the present invention, the reference position is preferably the center of the figure of the visual display region of the displaying unit. The center of figure of the visual display region divides a straight line which passes through the center of figure of the visual display region and extends from one end to the other end equally into two. Hence, as viewed from the reference position, a region of the left-hand direction and a region of the right-hand direction are equal to each other in size. The both regions on the both sides of the reference position are equal to each other in size, both in the forward/backward direction and the diagonal direction. Therefore, if a reference position is set at the center of the figure, it is possible to instruct and execute scrolling in all directions around the reference position, including the right/left direction, the forward/backward direction and the diagonal direction. This further improves the operability of scrolling.

In the invention, the visual display region of the displaying unit is almost flat, and the designating means is translucent and is a flat two-dimensional position detecting unit which is positioned on the visual display region.

According to the present invention, the designating unit is a translucent and flat two-dimensional position detecting apparatus, and is positioned on the visual display region of the displaying unit which is almost flat. Such a display apparatus uses, for example, a liquid crystal display apparatus and a cathode ray tube. The two-dimensional position detecting apparatus is called, for example, "touch panel" or "tablet." Since the designating unit is translucent, a user can look at a display image which is displayed in the visual display region through the designating means. In this manner, since a region in which the designating unit is disposed within the data processing apparatus is made coincides with the visual display region, it is possible to omit a region for disposing the designating unit.

While looking at the display image, the user selectively determines a point in a desired scroll direction for scrolling an image from the reference position, operates the designating unit which is immediately above the image on the point, and designates a position. In this manner, the user can operate the data processing apparatus while looking at the visual display region. In addition, the user can designate a designate position as if by directly pointing a certain point within the visual display region with a finger or a pen. This allows the user to instruct scrolling by intuition. Hence, it is easy even for an unexperienced user who is not familiar with an operation of the data processing apparatus to designate and operate the apparatus. This further improves the operability of the apparatus.

BRIEF DESCRIPTION OF THE DRAWINGS

Other and further objects, features, and advantages of the invention will be more explicit from the following detailed description taken with reference to the drawings wherein:

FIG. 5A is a view showing a memory structure of a memory;

FIG. 5B is a view showing a memory structure of a data part of the memory in detail;

FIG. 5C is a view showing a memory structure of a display position part of the memory in detail;

DETAILED DESCRIPTION OF PREFERRED EMBODIMENTS

Figure 1:
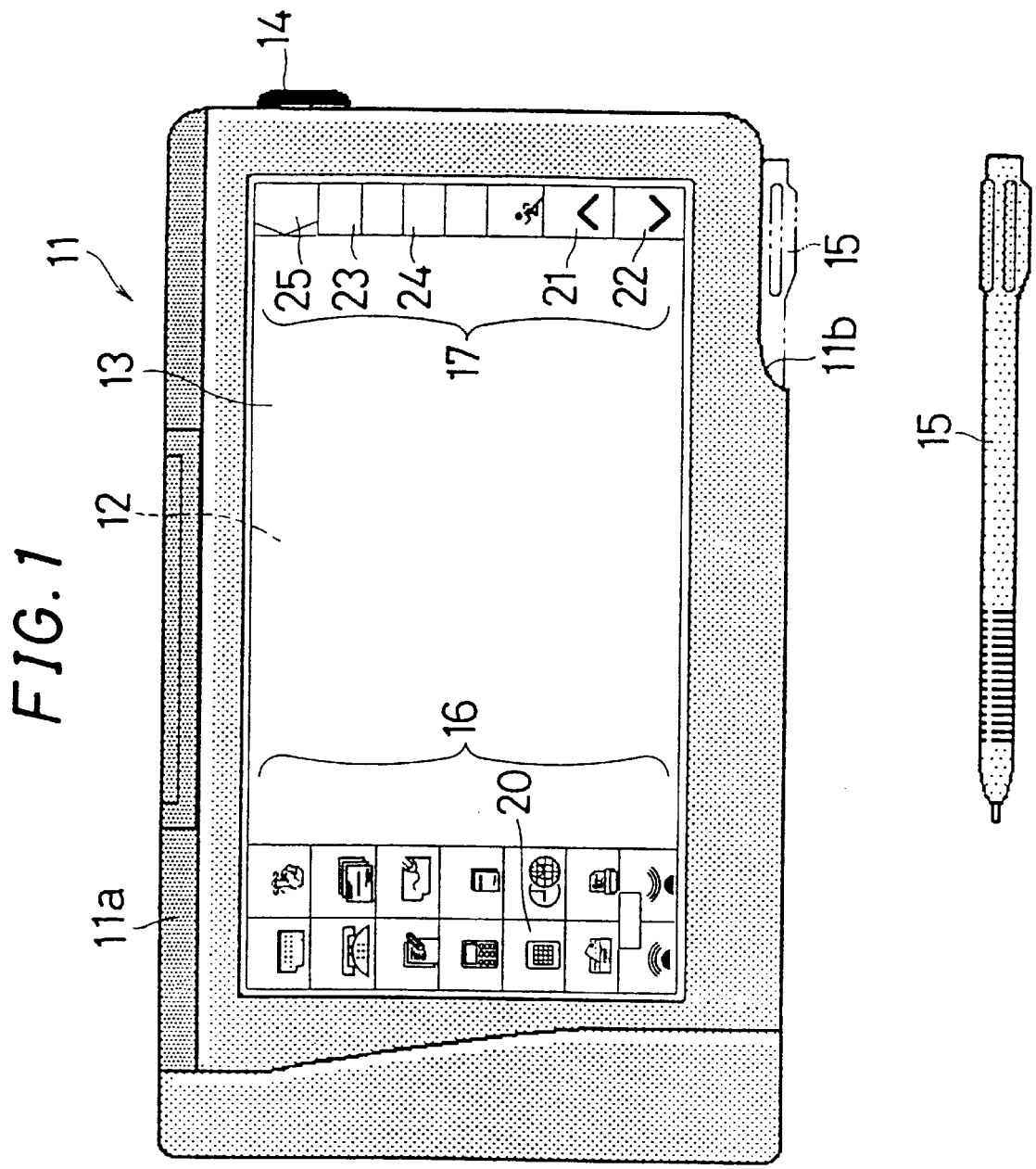
FIG. 1 is a view showing an appearance of an electric device which includes a data processing apparatus of a first embodiment of the present invention.

Now referring to the drawings, preferred embodiments of the invention are described below.

FIG. 1 is a view showing an appearance of an electric device 11 which includes a data processing apparatus according to a first embodiment of the present invention. The electric device 11 is a so-called electric scheduler which has a management function, such as a telephone book and a schedule, and a function of storing and editing a character string which is inputted.

The electric device 11 includes a display apparatus 12 and a coordinate inputting apparatus 13. The display apparatus 12 is realized by a liquid crystal display apparatus, for example. The coordinate inputting apparatus 13 includes a flat and plane member setting a two-dimensional coordinate system, and detects two-dimensional coordinates of a point within the flat and plane member at which a user contacts with a finger or a pen 15. The coordinate inputting apparatus 13 is translucent and is disposed on the displayed screen of the display apparatus 12, in contact with the displayed screen. The coordinate inputting apparatus 13 is realized by a touch panel which is called "a tablet."

Touch panels include resist film type touch panels, electrostatic capacity type touch panels, optical touch panels and supersonic touch panels. Any type of touch panel may be used as the coordinate inputting apparatus 13, in this embodiment.

A structure of a resist film type touch panel will be described in the following, for instance. A resist film type touch panel includes two transparent electrode members which are each formed by growing a translucent conductive thin film on a translucent glass or film. This touch panel is formed by disposing the transparent electrode members with the surfaces seating the conductive thin films facing each other with a gap between the same and by forming an insulation dot spacer in the surface seating the conductive thin film of one of the transparent electrode members. The insulation dot spacer is disposed to keep the two transparent electrode members spaced apart from each other and to prevent a contact between the thin films of the conductive members, when a finger of the pen 15 does not contact the touch panel.

If such a touch panel is pressed at one point, the conductive thin films of the two transparent electrode members short with each other at that point. Utilizing shorting, the pressing position is detected. Resist film type touch panels are classified into digital resist film type touch panels and analog resist film type touch panels, depending on a position detection method.

In a touch panel of the digital resist film type, the thin films above are processed to form electrodes each made of a strip-shaped thin film, and the transparent electrode members are disposed so that the longitudinal directions of the strip-shaped electrodes are perpendicular to each other. When an intersection of the strip-shaped transparent electrodes is pressed in a digital resist film type touch panel, shorting and hence electric connection are created between the strip-shaped transparent electrodes which intersect each other. By detecting the shorting position, the position at which the touch panel is pressed is detected.

In a touch panel of the analog resist film type, one uniform translucent conductive thin film is grown on each film and these transparent conductive thin films are faced each other, thereby forming the touch panel. Two pairs of detection electrodes are disposed at end portions of the transparent conductive thin films so that the detection electrodes are arranged on two straight lines orthogonal to each other. If such a touch panel is pressed at one point, the transparent electrodes short with each other. The two pairs of detection electrodes detect a voltage change which is created by shorting between the transparent electrodes, whereby the pressing point is detected.

In the case of a touch panel of the electrostatic capacity type, if the touch panel is an analog electrostatic capacity type touch panel, a transparent conductive thin film having a uniform resistance rate is formed on a glass surface to obtain a glass panel, and an element for applying the same voltage to the panel is connected to an end portion of the glass panel, so that the touch panel is completed. When a conductive object, such as a finger of a user, contacts the conductive film of the glass panel, the conductive film is grounded through the conductive object and the user whose has a conductive object, and consequently, a very small current flows. Two pairs of detection means which are disposed to the panel detect this very small current, whereby the pressing position is detected.

Referring back to FIG. 1, a power source switch 14 for switching a power source condition of the electric device 11 is disposed on a side surface of a housing 11a of the electric device 11. When the power source switch 14 is manipulated in a condition where the power source of the electric device 11 is OFF, the power source is turned on. In contrast, when the power source switch 14 is manipulated in a condition where the power source of the electric device 11 is ON, the power source is turned off. Further, a container part 11b for housing the pen 15, with which coordinates are inputted to the coordinate inputting apparatus 13, is also disposed on the side surface of the housing 11a of the electric device 11.

Figure 2:
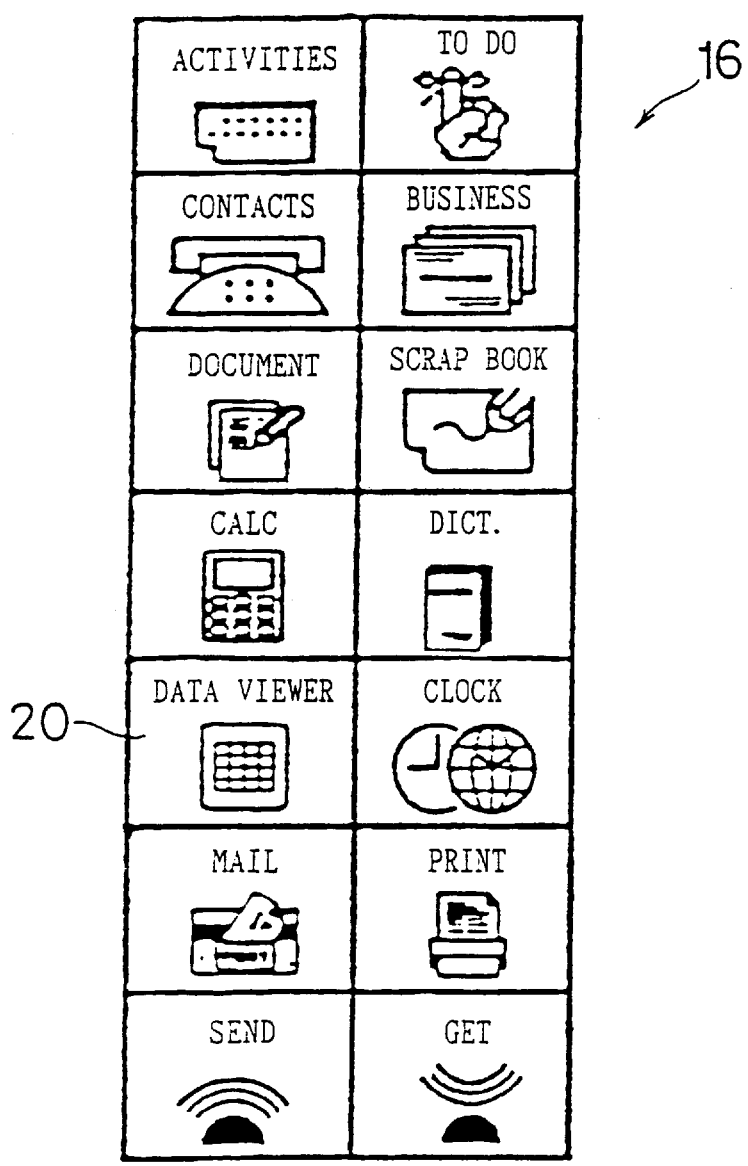
FIG. 2 is an expanded view showing an appearance of a mode key group of the electric device.
Figure 3:
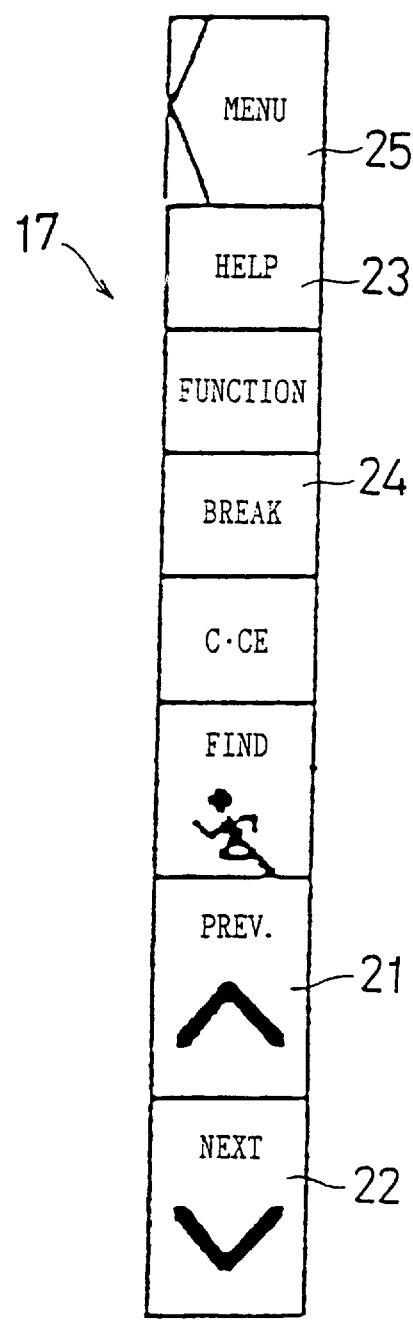
FIG. 3 is an expanded view showing an appearance of a function key group of the electric device.

The electric device 11 includes a mode key group 16 and a function key group 17. FIGS. 2 and 3 are expanded views showing the appearances of the key groups 16, 17. The mode key group 16 is a group of keys which switch functions of the electric device 11, such as a telephone book management function, schedule management function, and an input/edit function of character strings. The mode key group 16 includes a data processing mode key 20 for selecting a data processing function which allows for converting data into an image and for display and editing the image. The characters reading "DATA VIEWER" are displayed in the key 20.

The function key group 17 is a group of keys for instructing an executable operation in a condition where the function which is selected by manipulating any one of the keys of the mode key group 16 is being executed. The function key group 17 includes a PREV key 21, a NEXT. key 22, "HELP" key 23, a "BREAK" key 24 and a menu key 25. The PREV key 21 and the NEXT key 22 are keys for instructing to switch data which are displayed within the display apparatus 12 to other data. The "HELP" key 23 is a key for instructing to execute an explanation displaying function which explains to a user how to operation the electric device 11. The "BREAK" key 24 is a key for instructing to suspend a currently executed operation. The "MENU" key is a key for instructing to display a menu screen which is used to select and execute a plurality of operation functions.

Figure 4:
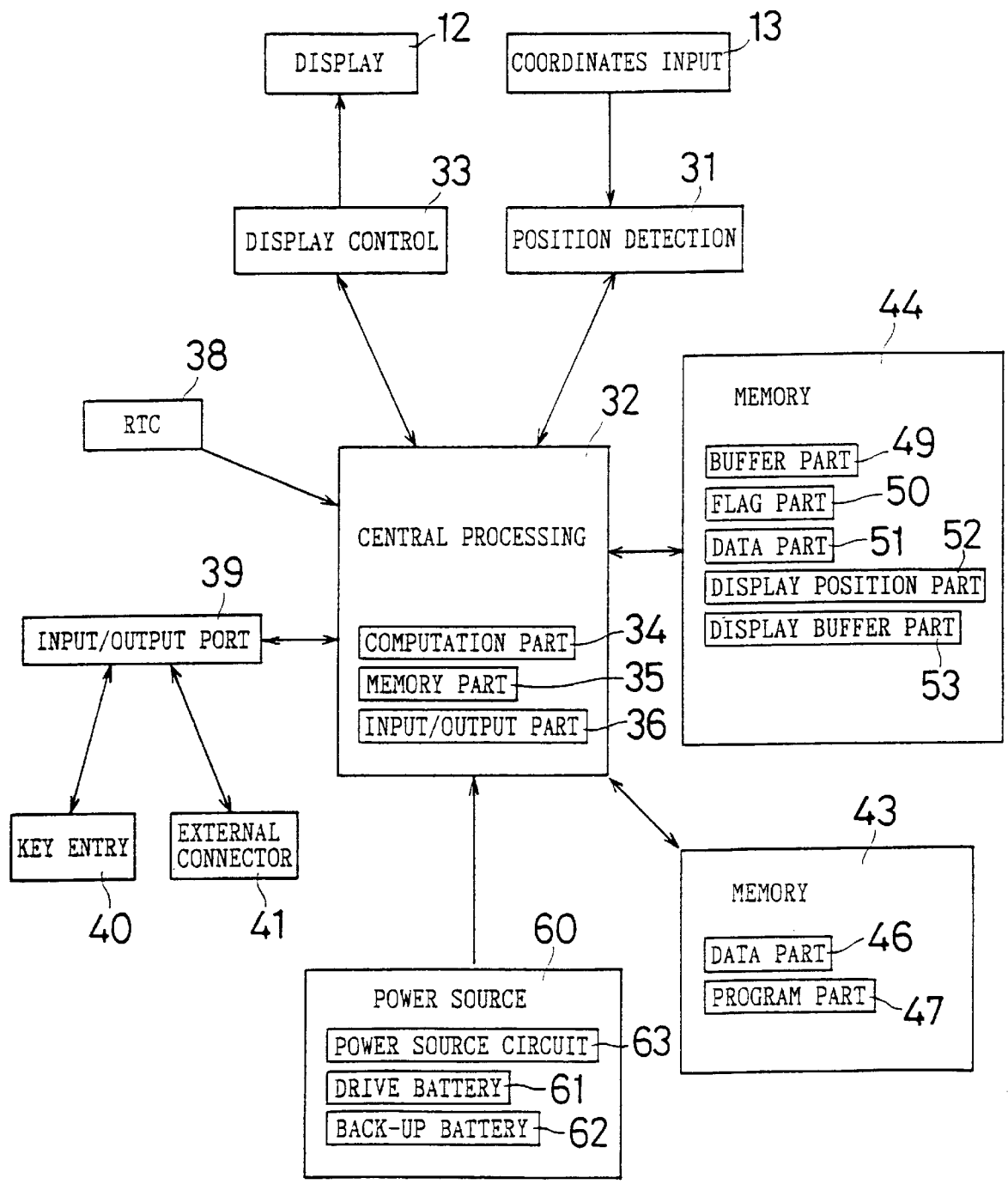
FIG. 4 is a block diagram showing an electric structure of the electric device.

FIG. 4 is a block diagram showing an electric structure of the electric device 11 which is shown in FIG. 1. The electric device 11 is comprised of the display apparatus 12, the coordinate inputting apparatus 13, a position detection apparatus 31, a central processing unit 32, a display control apparatus 33, an RTC (Real Time Clock) 38, an input/output port 39, key entry 40, an external connector 41, memories 43, 44, and a power source 60.

A point is inputted to the coordinate inputting apparatus 13, for example, by pressing down a surface of the coordinate inputting apparatus 13. When the coordinate inputting apparatus 13 is operated, the position detection apparatus 31 detects coordinates of the position at which the coordinate inputting apparatus 13 is operated and outputs positional information to the central processing unit 32. The central processing unit 32 provides the display control apparatus 33 with image data for displaying a display image within the display apparatus 12. The display control apparatus 33 controls the display apparatus 12, according to the image data supplied from the central processing unit 32.

The central processing unit 32 includes a computation part 34, a memory part 35, and an input/output part 36. The computation part 34 calculates to perform a processing operation which will be described later, based on an output supplied to the central processing unit 32. The memory part 35 includes an internal memory and a register which store data which are used for calculation at the computation part 34 and a calculation result. The input/output part 36 includes a buffer, and an input/output port for receiving an output supplied to the central processing unit 32.

The RTC 38 generates a clock pulse and supplies the same to the central processing unit 32. The input/output port 39 controls the key entry 40 including the mode key group 16 and the function key group 17 of the electric device 11, based on an output supplied from the central processing unit 32. Further, an output from the key entry 40 is supplied to the central processing unit 32 through the input/output port 39. The input/output port 39 transfers data between other electric devices which are connected through the external connector 41 and the central processing unit 32 of the electric device 11.

The central processing unit 32 reads data which are stored in the memories 43, 44. The memory 44 stores an output from the central processing unit 32.

The memory 43 is formed to include a data part 46 and a program part 47. The data part 46 stores, for example, font data and graphic data, and data of a conversion dictionary. The font data and graphic data are data for displaying a character in the display apparatus 12. Thus, the font data and graphic data are image data which show a visual display geometric figure which is unique to each character. The conversion dictionary is, for example converting an inputted hiragana character into a Chinese character during inputting of Japanese. Characters are a concept including hiragana characters, katakana characters, Chinese characters, alphabets, figures, symbols, pictograph, etc. A character string is a group of a plurality of characters.

The program part 47 stores a program for performing a function which corresponds to each key of the mode key group 16 described above, for instance, and a program for controlling an operation of the electric device 11. The memory 43 is realized by a read only memory, for instance.

The memory 44 includes a buffer part 49, a flag part 50, a data part 51, a display position part 52, and a display buffer part 53. The memory 44 is realized by a random access memory, for instance. The buffer part 49 is used to temporarily store data during execution of the program stored in the program part 47. Similarly, the flag part 50 stores a flag which is used to execute the program stored in the program part 47.

The data part 51 stores visual display data which are to be visually displayed in the display apparatus 12, in a format which can be displayed in the display screen of the display apparatus 12. The area of a virtual image which is obtained by virtually visually displaying all of the visual display data is larger than the area of the display screen of the display apparatus 12. The display position part 52 stores data indicating a store position where partial data, i.e., a part of the visual display data, which are imaged and visually displayed on the display screen of the display apparatus 12, are stored in the data part 51. The display buffer part 53 stores image data of a display image which is visually displayed in the display screen of the display apparatus 12, as described later.

FIG. 5a is a view showing a memory structure of the memory 44. The data part 51 and the display position part 52 are set within the memory 44. In a display data portion 54 which is shaded in FIG. 5a of the data part 51, the partial data which are visualized and visually displayed in the display screen of the display apparatus 12 are stored.

FIG. 5b is a view showing a memory structure of a data part 51 in detail. In the data part 51, (N×M) memory areas 55(1, 1) to 55(N, M) are set (These memory areas will be collectively referred to as "memory area 55."). In the data part 51, visual display data are divided and each stored in each memory area 55. The visual display data are divided, so as to correspond to (N×M) blocks which are formed by dividing a virtual image of the same into a matrix of N rows and M columns. Each memory area 55 stores data which are to be visually displayed within each block. When the data stored in the data part 51 are character data, the virtual image is divided so that a visual display geometric figure of one character is included in one block. Each memory area 55 stores image data of the visual display geometric figure of each character, or codes which express each character.

The data in each block are sequentially stored in the memory areas 55(1, 1) to 55(N, M), primarily in the forward/backward direction of the virtual image and secondarily in the right/left direction of the virtual image. A memory area (n, m) stores data of a block which is located at an n-th place in the forward/backward direction and an m-th place in the right/left direction. The memory area 55(1, 1), for example, stores the left-most piece of data of the first row in the forward/backward direction.

Fig. 5c is a view showing a memory structure of the display position part 52 in detail. The display position part 52 includes memory areas 57, 58. The memory area 57 stores the display start address A1, which is a start address of the display data portion 54 of the data part 51. The memory area 58 stores a value of data quantity which can be displayed in the display screen of the display apparatus 12. The quantity of data is equal to the quantity of data at the display data portion 54.

Referring back to FIG. 4, electricity is supplied to the central processing unit 32 from the power source 60. The power source 60 includes a drive battery 61, a back-up battery 62, and a power source circuit 63. The drive battery 61 is a battery for supplying electricity which is needed to drive the entire electric device 11. The back-up battery 62 is a battery for supplying electricity which is needed to hold the contents which are stored in the memory 44 and the memory part 35 of the central processing unit 32. The power source circuit 63 raises or divides the voltages of the batteries 61, 62 to thereby convert the same each into a predetermined voltage. Further, the power source circuit 63 performs a low battery check for detecting dissipation of the batteries 61, 62.

In the electric device 11 of the present embodiment, when the data processing mode key 20 of the mode key group 16 is operated, the data processing function is executed. When this processing is executed, a portion of the data which are stored in the data part 51 of the memory 44 is visualized and visually displayed in the display apparatus 12. An operation of the data processing function includes an operation under the display mode and an operation under the edit mode. In the edit mode, a new input operation of newly inputting data and correction of visually displayed data are performed.

Figure 6:
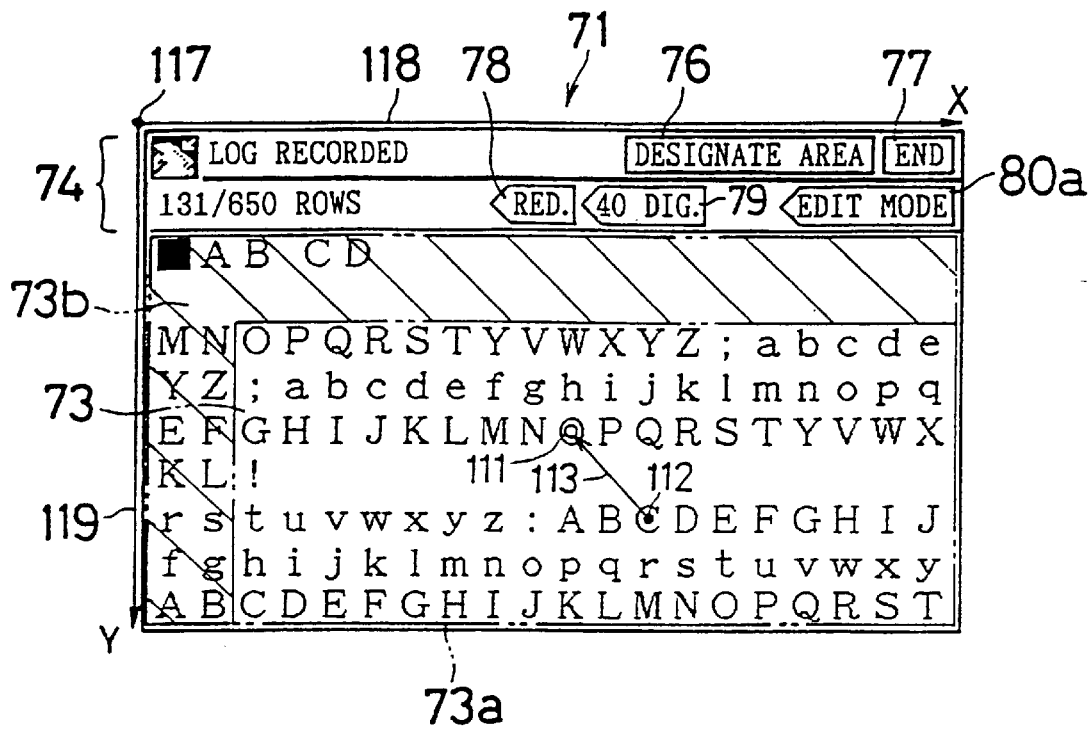
FIG. 6 is a view of a display image displayed in display apparatus when a data processing function is executed and display mode is selected, and an X-coordinate axis and a Y-coordinate axis which are set in a display screen of the display apparatus.
Figure 7:
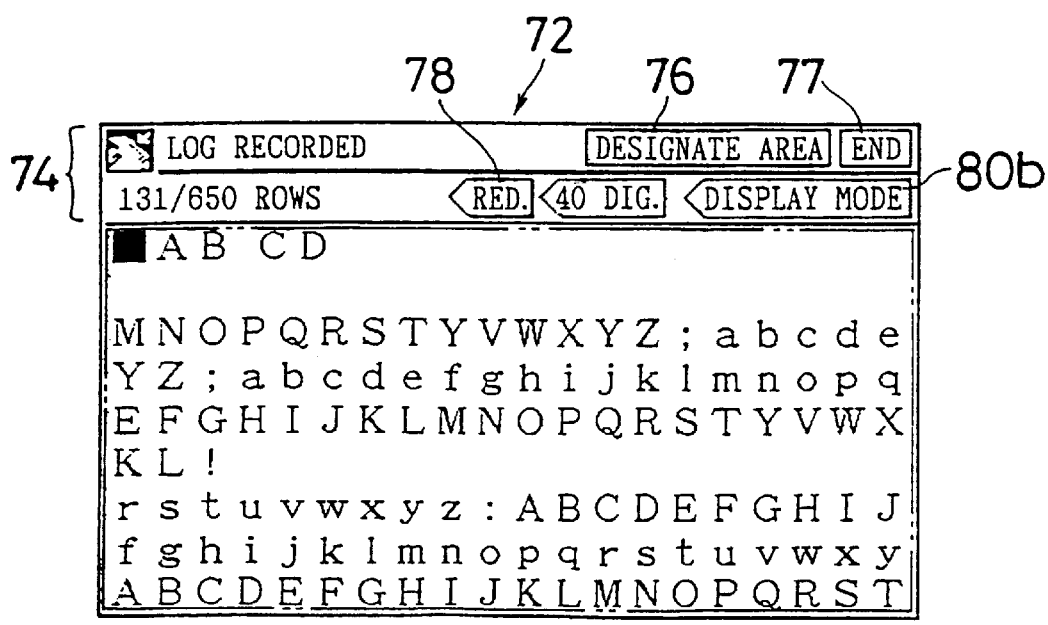
FIG. 7 is a view of a display image which is displayed in the display apparatus when an edit mode is selected and a data processing function is executed.

FIG. 6 is a view of a display image 71 which is displayed on the display screen of the display apparatus 12 when the data processing function is executed and a display mode is selected. FIG. 7 is a view of a display image 72 which is displayed in the display screen of the display apparatus 12 when an edit mode is selected and the data processing function is executed. The displayed images 71, 72 are similar images, and therefore, identical portions are denoted by identical reference numerals.

The displayed images 71, 72 include a data image portion 73 and an instruction display portion 74. As described later, the data image portion 73 is an image which is obtained by visualizing the partial data which are stored in the display data portion 54 of the data part 51.

The instruction display portion 74 includes a plurality of image components. These image components are displays which clearly show to a user that the data processing function is being executed, and images of buttons which are used during the data processing function, for instance. The image components reading "LOG RECORDED" are a comment which shows that the data processing operation is being executed, for example, and do not change until the data processing operation is completed. The image components reading "131/650 ROWS" are a comment which shows a start row of data whose portion is visualized and visually displayed. In this embodiment, visual display data are character data which are formed by a number of characters, and the start position of a partial data of the visual display data is expressed by a character row. In the following, "a row" will refer to a group of structural elements which are arranged in the right/left direction. Meanwhile, "a column" will refer to a group of structural elements which are arranged in the forward/backward direction.

In the instruction display portion 74, image components reading "DESIGNATE AREA", "END", "RED.", "40 DIG.", "EDIT MODE", and "DISPLAY MODE" in framed portions are images of buttons 76 to 80 for instructing an operation which is executed by the data processing function.

In the electric device 11 according to the present embodiment, the buttons 76 to 80 are formed by combining images which are displayed in the display screen of the display apparatus 12 and the coordinate inputting apparatus 13 which is located immediately above these images when these images are displayed. When coordinates which are inputted coordinates the coordinate inputting apparatus 13 denote a position which corresponds to a position at which the image of each one of the buttons 76 to 80 within the display screen is displayed, it is judged that each one of the buttons 76 to 80 is operated. In other words, a portion of the coordinate inputting apparatus 13, which is partitioned by the image of each one of the buttons 76 to 80 which is displayed in the display apparatus 12, can be used as inputting means which is equivalent to the keys of a keyboard. Hence, when the coordinates of the partitioned area are detected, it is judged that the buttons 76 to 80 are operated which are displayed in the display apparatus 12 immediately below the partitioned area, and therefore, functions which are set associated with the buttons 76 to 80 are executed.

For example, an image 80a reading "EDIT MODE" and an image 80b reading "DISPLAY MODE" are the image of a switch button 80. The switch button 80 is a button for switching the display mode and the edit mode described earlier. Every time the switch button 80 is operated, a selected one of the two modes which is currently in operation is switched to the other one of the two modes, and vice versa. At the same time, the image 80a and the image 80b are alternately switched to each other. When the mode of the data processing function is switched to the display mode, the image 80a is drawn in the instruction display portion 74 as the image of the switch button 80. When the mode is switched to the edit mode, the image 80b is drawn as the image of the switch button 80. The other buttons 76 to 79 will be described later.

With the respective buttons 76 to 80 of the inputting means which are set in combination of the display apparatus 12 and the coordinate inputting apparatus 13, an arrangement within the display screen can be easily changed, only by changing a program which associates an inputted image with a display image. In addition, by erasing the images of the buttons 76 to 80, the buttons can be temporarily deleted. Hence, using such buttons 76 to 80 as described above as inputting means in an electric device of a limited size, such as a small electric scheduler, in particular, the display screen of the display apparatus 12 can be utilized as large as possible.

The data image portion 73 described above is an image which is obtained by visualizing a partial data of the visual display data which are stored in the data part 51. As described above, the visual display data are visualized corresponding to a virtual display region which is larger than the data image portion 73. Hence, the data image portion 73, which is equal to the partial data as they are visualized into an image, is equivalent to a partial image which is obtained by partially cutting out the virtual image of the visual display data. Therefore, it is regarded that the remaining image of the virtual image except for the partial image, which is not visually displayed virtually exists in a peripheral portion on four sides of the data image portion 73. The remaining image is data which are not visually displayed in the display apparatus 12 and corresponds to the remaining data of the visual display data except for the partial data. In the electric device 11, to visually display the remaining image in the display screen of the display apparatus 12, the image is scrolled. Scrolling for this purpose is instructed by designating a point within the display screen which corresponds to the data image portion 73.

Figure 8:
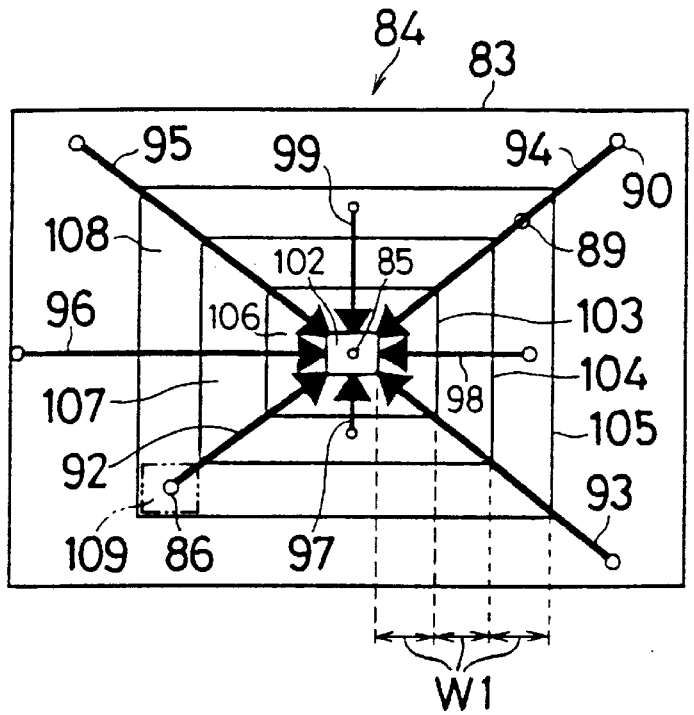
FIG. 8 is a schematic diagram for describing scrolling of the embodiment.

FIG. 8 is a schematic diagram for describing scrolling operation which is performed in the electric device 11. An outer frame 83 is a portion of the display screen of the display apparatus 12, and shows an edge portion of a scroll area 84 which serves as the visual display region for visually displaying the partial data. The outer frame 83 corresponds to a boundary line 73a of the data image portion 73 shown in FIG. 6, and the data image portion 73 is visually displayed only within the scroll area 84. Of the display image visually displayed in the display screen, only an image which is displayed within the scroll area 84 is scrolled.

A reference point 85 is set in the scroll area 84. The reference point 85 may be set at any position within the scroll area 84. In this embodiment, the reference point 85 is set at the center of figure of the scroll area 84.

When instructing scrolling, a user of the electric device 11 designates a point 86 at a desired position within the scroll area 84, using the coordinate inputting apparatus 13. For instance, when a user presses down a certain point on the area 84 of the coordinate inputting apparatus 13 which is disposed over the display screen of the display apparatus 12, with the pen 15, a point in the display screen immediately below the pressing point is designated as the designate point.

When the designate point 86 is designated, the central processing unit 32 scrolls the data image portion 73 which is displayed in the display screen of the display apparatus 12 in such a manner that an image component of the data image portion 73 which is being displayed at the same position as the designate point 86 is displayed at the same position as the reference point 85. That is, an image component which is displayed immediately below a point at which a user presses down the coordinate inputting apparatus 13 is scrolled to a position at the center of the display apparatus 12.

Scrolling is performed just like switching an image, for example, in this embodiment. The quantity of scrolling an image is designated as a quantity which is equal to a distance between the reference point 85 and the designate point 86. Hence, as the distance between the reference point 85 and the designate point 86 is larger, the image is scrolled over a longer distance. For instance, between a case where a point 89 within the area 84 is designated and a case where a point 90 within the area 84 is designated, the quantity of image movement as a result of one scrolling is larger in the case where the point 90 is designated. This makes the scroll speed falsely felt by a user faster.

In addition, the direction of scrolling the image is designated as a direction which is the same as the direction extending from the designate point to the reference point 85. That is, when the designate point 86 is designated, the image is scrolled in the direction denoted by a vector 92, i.e., upward to the right-hand side, in this embodiment. In this manner, in the electric device 11, a user can scroll an image in an optional direction desired by the user. The direction of scrolling can be designated not only as the direction of the vector 92 but as any one of diagonal direction denoted by vectors 93 to 95 and the right/left and forward/backward directions denoted by vectors 96 to 99.

Further, when a plurality of areas are set in the scroll area 84 and designation of a point is conducted in each area, an image may be scrolled by a predetermined quantity corresponding to these areas. For example, where a width W1 is a unit of scrolling, frames 103 to 105 are set at positions which are away from the central area 102 by an integer-multiple of the width W1. In addition, the scroll area 84 is partitioned with the edge portion of the central area 102 and the frames 103 to 105, thereby setting areas 106 to 108.

When an image is scrolled based on designate points which are set within the areas 106 to 108, the quantity of scrolling is determined for each one of the areas 106 to 108. When the designate point 86 within the area 108 is designated, for instance, the image is scrolled so that the image component of the area 109 including the designate point 86 is displayed in the area 102 which includes the reference point 85. At whichever position the designate point 86 is set as far as within the area 109, scrolling of the same quantity is performed.

Where a reference point 111 is set over an image component "O" in the data image portion 73 shown in FIG. 6 described above and a designate point 112 is set over an image component "C" the data image portion 73 is scrolled by the magnitude of a vector 113 in the direction of the vector 113 extending from the designate point 112 to the reference point 111.

Figure 9:
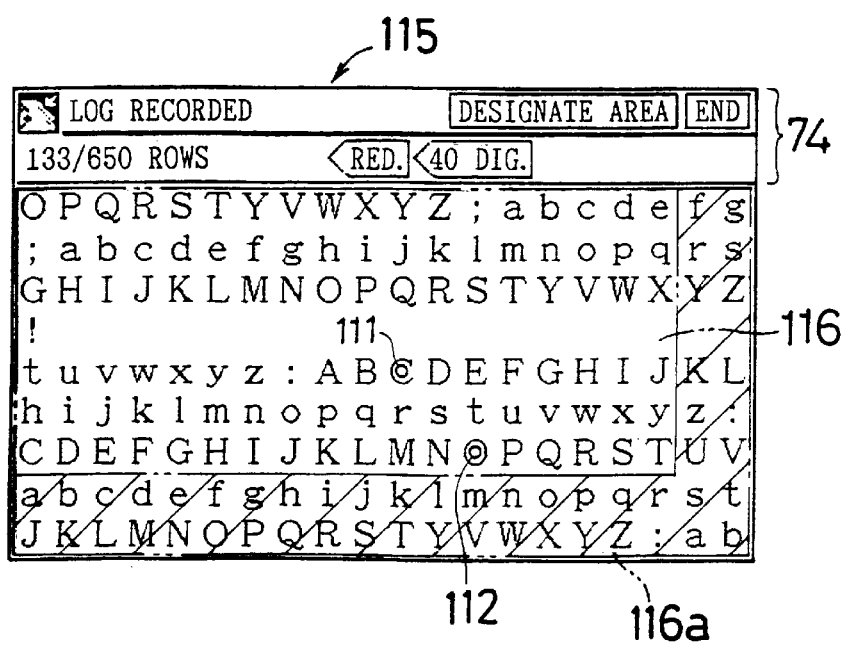
FIG. 9 is a view of a display image as it is after scrolling.

FIG. 9 is a view of a display image 115 which is visually displayed in the display screen of the display apparatus 12 after scrolling. A data image portion 116 of the display image 115 is an image in which a shaded portion 73b of the data image portion 73 is erased and to which a portion 116a of the image of data which are newly visually displayed is added at an edge portion facing the portion 73b with the reference point 111 in-between. In the data image portion 116, the image component "O" is displayed at the center of figure of the data image portion 116, i.e., at a position overlapping the reference point 111. When the display image 115 including such image portion 116 replaces the display image 71 and is visually displayed, a user feels that the data image portion 73 is scrolled by the magnitude of the vector 113 in the direction of the vector 113.

Thus, in the electric device 11 according to this embodiment, scrolling is performed by easily designating the direction and the quantity of scrolling. In addition, the direction and the quantity of scrolling can be easily designated based on the position of a designate point which is designated by a user.

Figure 10:
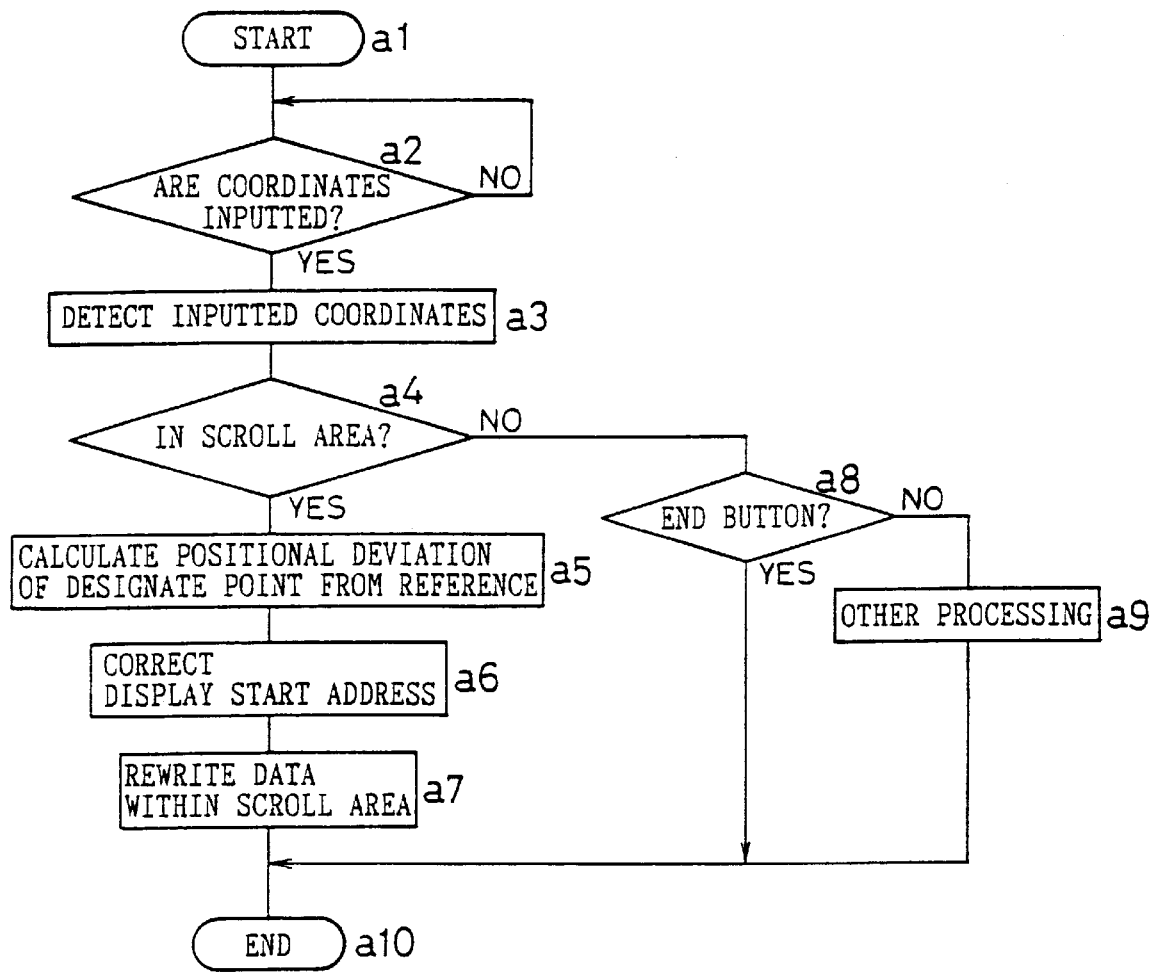
FIG. 10 is a flow chart for describing scrolling which is executed using the electric device.

FIG. 10 is a flow chart for describing scrolling which is executed using the electric device 11 which is shown in FIG. 1. In scrolling according to this embodiment, a deviation of a designate point designated by a user of the electric device 11 from the predetermined reference point in coordinates is calculated, and an image component which is displayed at a position which corresponds to the designate point is displayed at a position which corresponds to the reference point.

In the electric device 11, when execution of the data processing function is instructed as a result of manipulation of the data processing mode key 20 of the mode key group 16 and the display mode of the data processing function is selected, the sequence proceeds to a step a2 from a step a1.

At the step a2, whether coordinates are inputted to the coordinate inputting apparatus 13 is judged. Through the position detection apparatus 31, the central processing unit 32 detects whether a signal expressing input of coordinates from the coordinate inputting apparatus 13 is outputted, for every few μ seconds. When the coordinate inputting apparatus is a touch panel, for example, the position detection apparatus 31 detects whether there is a voltage change in an output from the coordinate inputting apparatus 13 and supplies a result to the central processing unit 32. In response to an output from the position detection apparatus 31, when a voltage change in an output from the coordinate inputting apparatus 13 is detected successively predetermined times, e.g., a few times, the central processing unit 32 judges that coordinates are inputted. In other words, when the coordinate inputting apparatus 13 is pressed with the pen 5 or the like, the central processing unit 32 judges that coordinates are inputted. When it is judged that coordinates are inputted, the sequence proceeds to a step a3 from the step a2. When it is judged that coordinates are not inputted, the sequence returns to the step a2.

At the step a3, coordinates inputted through the coordinate inputting apparatus 13 are detected. When the coordinate inputting apparatus 13 is a touch panel of the analog resist film type, for example, the position detection apparatus 31 has one of the two pairs of detection electrodes, which are disposed in the two perpendicular coordinate axis directions, detect a voltage gradient between the electrodes of the other pair. The two pairs of detection electrodes alternately detect, and a result of the detection is supplied to the central processing unit 32 after analog/digital-converted at the position detection apparatus 31. The central processing unit 32 detects which position of the coordinate inputting apparatus 13 is pressed based on the quantity of the detected voltage change, to thereby detect a coordinate value of the inputted coordinates. In this embodiment, coordinates are two-dimensional coordinates which are determined based on the two coordinate axis directions which are perpendicular to each other.

Upon detection of the coordinates, the sequence proceeds to a step a4 from the step a3. At the step a4, whether the coordinates inputted from the coordinate inputting apparatus 13 are included in an area of the coordinate inputting apparatus 13 which corresponds to the scroll area 84 of the display screen of the display apparatus 12 is judged. Based on data and a program stored in the memory 43 and the image data of a display image which are stored in the memory 49, the central processing unit 32 judges which position of the display image 71, which is displayed in the display screen of the display apparatus 12, the inputted coordinates correspond to.

In the electric device 11, when the coordinate inputting apparatus 13 immediately above a display image which is displayed in the display screen of the display apparatus 12 is pressed down or otherwise appropriately operated and coordinates of this position are consequently supplied, it is judged that coordinates of a position which corresponds to an image which is located immediately below this position are inputted through the coordinate inputting apparatus 13. A predetermined portion immediately above an image component of a display image of the coordinate inputting apparatus 13, i.e., a portion within a predetermined range, is defined as a touch area. Predetermined image components of a display image are the images of the buttons 76 to 80 and the data image portion 73 described above. A button is formed by combining the images of the buttons 76 to 80 and the touch area which is immediately above the images of the buttons 76 to 80.

When it is judged that the inputted coordinates are coordinates which are included in the touch area of the data image portion 73, i.e., that the inputted coordinates are the coordinates inputted from the coordinate inputting apparatus 13 which is located immediately above the scroll area 84 of the display screen of the display apparatus 12, the sequence proceeds to a step a5. At the step a5, determining that a point within the display screen of the display apparatus 12 corresponding to the inputted coordinates is a designate point for instructing scrolling, the scroll direction and the quantity of scrolling, a positional deviation between the predetermined reference point, which is set in the scroll area 84 of the display screen in advance, and the designate point is calculated.

In the display screen of the display apparatus 12, a two-dimensional X coordinate system is set. The respective coordinate axes of the two-dimensional XY coordinate system are set to be perpendicular to each other from an origin which is a position where a point 117 in the above on the left-hand side is displayed, for instance, when the display image 71 of FIG. 6 is visually displayed in the display screen. An X-coordinate axis 118 is set to pass through the origin 117, and parallel to the right/left direction. A Y-coordinate axis 119 is set to pass through the origin 117, and parallel to the forward/backward direction.

The positional deviation between the reference point and the designate point is expressed as a deviation in coordinates between the reference point and the designate point. Where the coordinates of the reference point are (Xc, Yc), and the coordinates of the designate point are (Xs, Ys), for instance, the positional deviation between the reference point and the designated point is expressed as (Xc-Xs, Yc-Ys). That is, the positional deviation is expressed as a vector whose magnitude is a distance between the reference point and the designate point and whose direction is the direction from the designate point to the reference point. In the electric device 11, an image is scrolled, using the direction of the vector as the direction of movement and the magnitude of the vector as the quantity of movement. Upon calculation of the positional deviation of the designate point from the reference point, the sequence proceeds to a step a6 from the step a5.

At the step a6, the display start address A1 is corrected. The display start address A1 is a position which serves as a basis of reading partial data which are to be visually displayed as a data image portion in the scroll area 84 from the data part 51, as described later. The display start address A1 is corrected into such a start address of a portion of the data part 51 which stores partial data corresponding to a new image which is moved so that an image component at a position corresponding to a designate point within the display image 71 which is visually displayed in the scroll area 84 is displayed at a position corresponding to the reference point. The value of the display start address A1 as it is corrected is updated and stored in the memory area 57 of the display position part 52 of the memory 44. Upon correction of the display start address A1, the sequence proceeds to a step a7 from the step a6.

At the step a7, based on the corrected display start address A1, the partial data which are to be visualized and visually displayed within the scroll area 84 are rewritten. First, using the corrected display start address A1 as a basis, the partial data are read into the display buffer part 53 from the data part 51 of the memory 44. Following this, the data in the display buffer part 53 are transferred to the display control apparatus 33. Upon transfer of the data, the display control apparatus 33 allows the display apparatus 12 to display a display image including the new data image portion. Through such a processing operation, in the scroll area 84 of the display screen of the display apparatus 12, the data display image 116 of the display image 115 shown in FIG. 9 is displayed.

When it is judged at the step a4 that the inputted coordinates are coordinates which correspond to an area of the display screen other than the scroll area 84, the sequence proceeds to a step a8 from the step a7. At the step a8, whether the inputted coordinates are included in the touch area of an end button 77 is judged. When the inputted coordinates are not included in the touch area of the end button 77, the sequence proceeds to a step a9, from the step a8 to thereby execute a processing operation corresponding to an image which corresponds to a touch area which includes the inputted coordinates. When the inputted coordinates are included in the touch area of the switch button 80, for example, the mode of the data processing function operation is switched from the display mode to the edit mode. Meanwhile, when the inputted coordinates are included in a portion other than the touch area of the buttons 76 to 80 and the touch area of the scroll area 84, a processing corresponding to a button and coordinates including this touch area is performed.

Upon rewriting of the partial data which are displayed in the scroll area 84 at the step a7, the sequence proceeds to a step a10 from the step a7 to thereby end the operation shown in this flow chart. Similarly, when it is judged at the step a8 that the touch area of the end button is touched, and also when other processing operation corresponding to the inputted coordinates is completed at the step a9, the sequence proceeds to the step a10 to thereby end the processing operation.

As described above, in the electric device 11 according to this embodiment, when a user designates an optional point within the scroll area 84, the direction and the quantity of scrolling are designated and scrolling is accordingly executed. Such scrolling is carried out in units of a dot which are fine regions dividing the display screen, for instance. These regions are equivalent to pixels of the display screen. Scrolling in this flow chart is advantageously applicable to visualizing and visual displaying of map data which are used for navigation. Alternatively, scrolling may be executed in units of a predetermined block such as a character.

Figure 11:
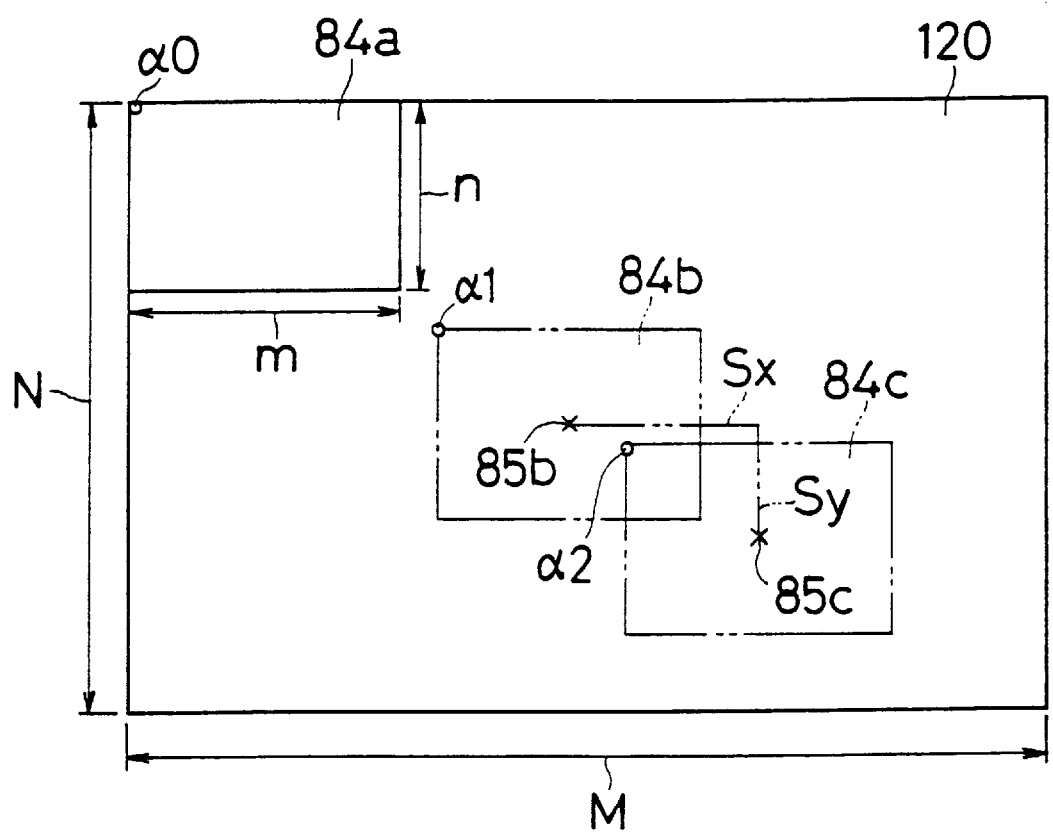
FIG. 11 is a view showing a relationship between a virtual image, which is obtained by visualizing all data of the data part into an image at once, and a data portion which is displayed in a scroll area of a display screen of the display apparatus.

FIG. 11 is a view showing a relationship between a virtual image 120, which is obtained by visualizing all data stored in the data part 51 into an image at once, and a data portion which is displayed in a scroll area 84 of a display screen of the display apparatus 12. It is assumed that the visual display data are character data which are comprised of a number of characters. The scroll area 84 described above is large enough to arrange m character images in an X-direction, which is the right/left direction, and n character images in a Y-direction, which is the forward/backward direction, in a matrix form arrangement with a predetermined gap between adjacent images. In short, the images of the characters can be displayed in a matrix of n rows and m columns.

A virtual image 120 displays the images of the characters in an arrangement of N rows and M columns, which are larger than n and m, respectively. The image of the partial data which can be displayed in the scroll area 84 is equal to a condition where the virtual image 120 is partially cut out. Of the virtual image 120, areas 84a, 84b and 84c show the image of the partial data which is displayed in the scroll area 84. The position of the image of the partial data within the virtual image 120 may not be the positions of the areas 84a, 84b and 84c but may be other position.

Figure 12:
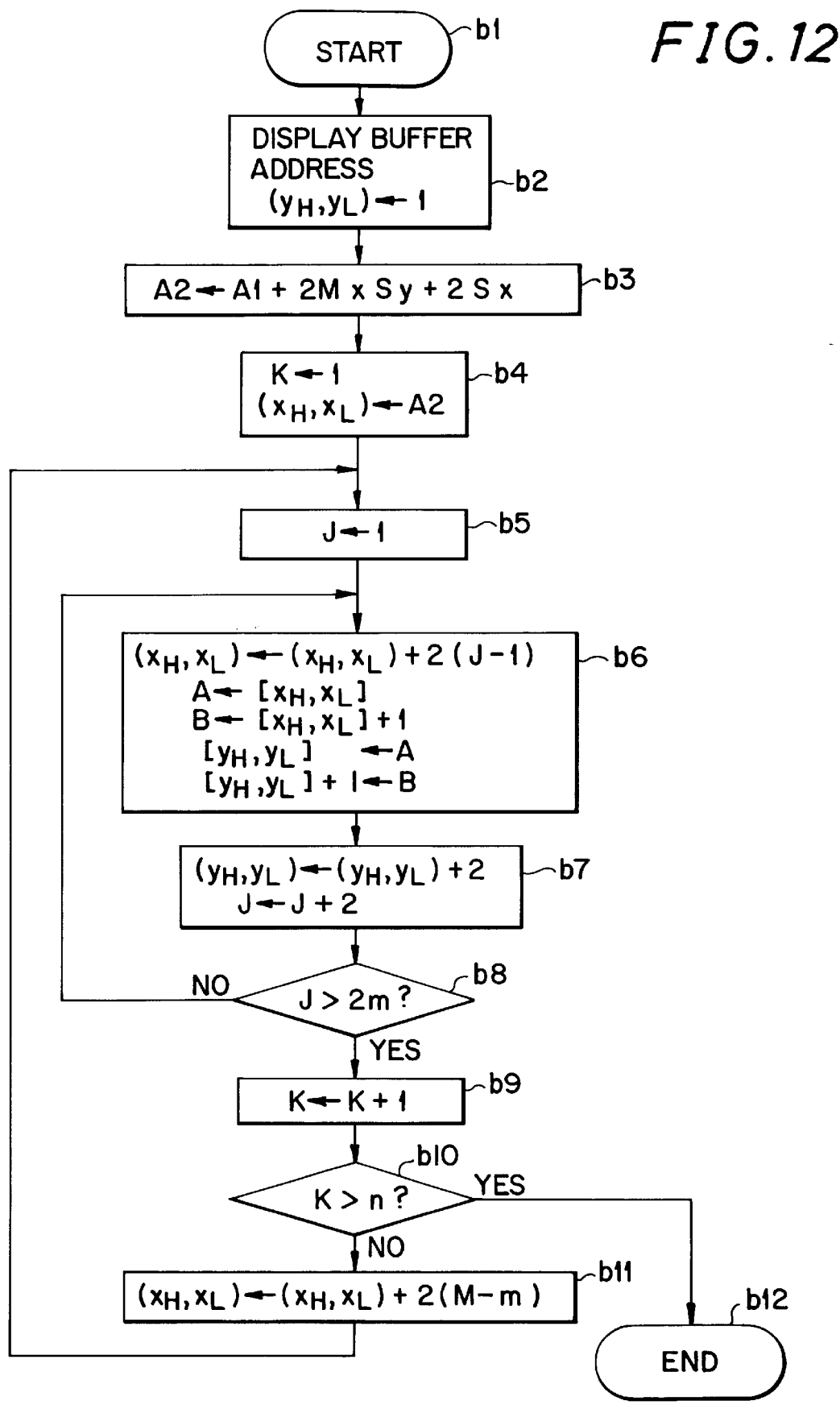
FIG. 12 is a flow chart for describing correction of a display start address and rewriting of data within the scroll area in detail in the flow chart in FIG. 10.
Figure 13:
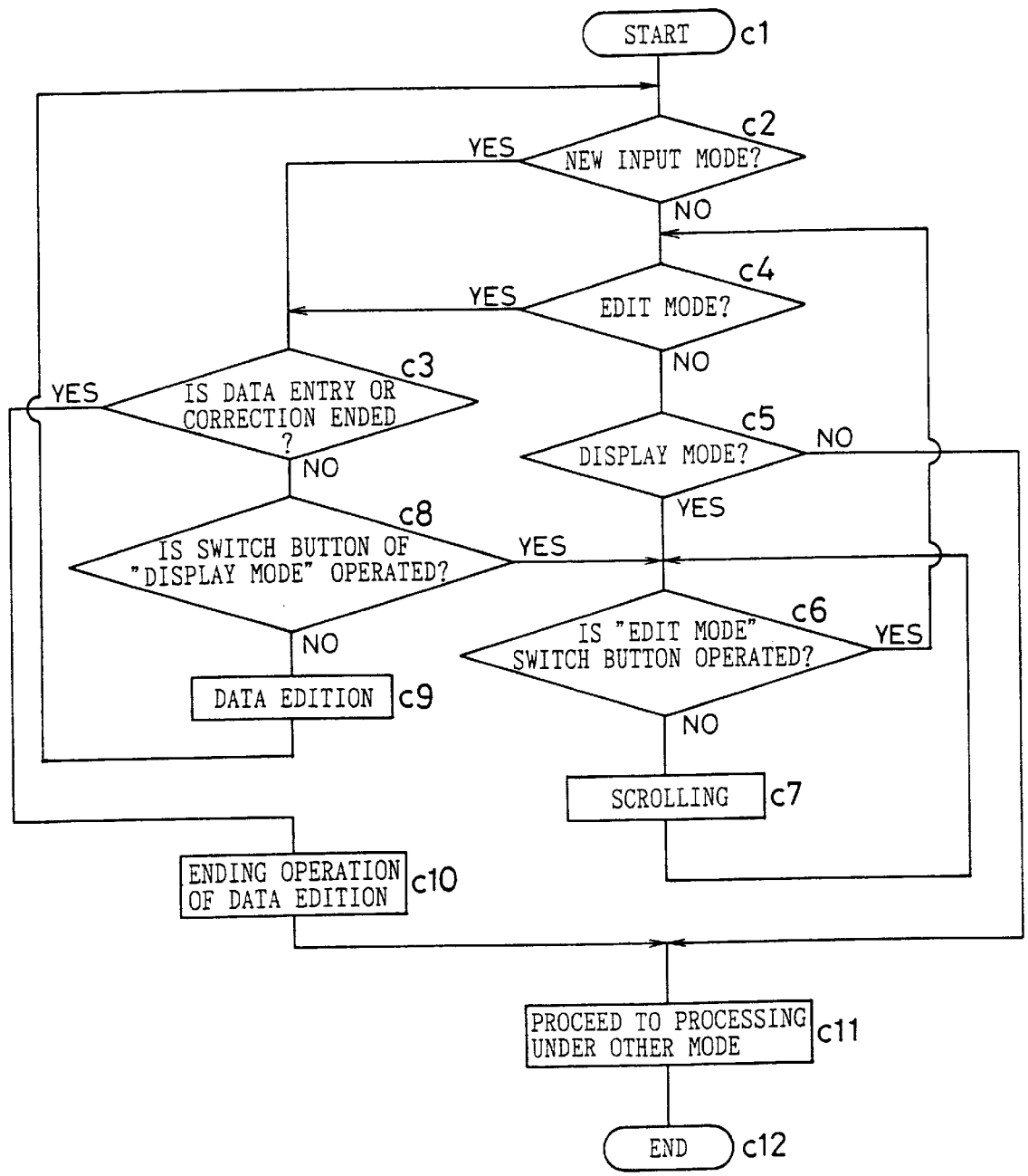
FIG. 13 is a flow chart for describing a mode switching operation of switching the display mode and the edit mode during execution of the data processing function in the electric device.

FIG. 12 is a flow chart for detailed explanation of the operation of correcting the display start address A1 and the operation of rewriting data within the scroll area, which are executed at the steps a6 and a7, respectively, in the flow chart in FIG. 10. Before performing an operation shown in this flow chart, a point 85c is designated, from a condition where the partial data which is defined by the area 84b shown in FIG. 11 are displayed as a data image portion. The designate point is positionally deviated from the reference point by Sx characters in the X-direction and by Sy characters in the Y-direction. The display start address A1 is an address of the memory area 55 of the data part 51 which corresponds to an image component of a point $\alpha 1$ at an upper corner of the left-hand side of the area 84b.

Upon calculation of the positional deviation of the designate point from the reference point at the step a5 in the flow chart in FIG. 10, the sequence proceeds to a step b2 from a step b1. At the step b2, an intial value of 1 is substituted in a register ($y_H$, $y_L$) which denotes the address of a memory area of the display buffer part 53 of the memory 44 for initialization. The display buffer part 53 has a similar memory structure to the data part 51 and includes (n×m) memory areas. Upon initialization of the address, the sequence proceeds to a step b3 from the step b2.

At the step b3, based on the positional deviation and the current display start address A1, a display start address A2 after scrolling is calculated by:

$$A2 \leftarrow A1 + 2 \cdot M \cdot Sy + 2 \cdot Sx \tag{1}$$

The second and the third terms on the right-hand side of the formula above express a difference in address between the memory area 55 which corresponds to the point α1 of the area 84b and the memory area 55 which corresponds to a point α2 of the area 84c around the point 85c.

As described above, the virtual image is partitioned into (N×M) blocks in the data part 51, and the data part 51 stores image data of the respective blocks as they are arranged primarily in the X-direction and secondly in the Y-direction. Hence, a positional deviation in the Y-direction by Sy rows is equal to a deviation skipping a group consisting of M memory areas which corresponds to one block column by Sy in the address of the data part 51. That is, the positional deviation is equal to a displacement of (M×Sy) memory areas. At the second and the third terms on the right-hand side, positional deviation values Sx, Sy expressed by characters are doubled, since each memory area is set as 2 bytes in the data part 51.

Referring to FIG. 12 again, upon calculation of the new display start address A2, the sequence proceeds to a step b4 from the step b3. At the step b4, the initial value of 1 is substituted in a counter K for initialization. At the same time, the display start address A2 is substituted in a register ($x_H$, $x_L$) which denotes the address of the data part 51. Upon setting the counter K and the register ($x_H$, $x_L$), the sequence proceeds to a step b5 from the step b4. At the step b5, the initial value of 1 is substituted in a counter J for initialization. The sequence then proceeds to a step b6.

At the step b6, {2·(J−1)} is added to the register ($x_H$, $x_L$) for the purpose of updating.

$$(x_H, x_L) \leftarrow (x_H, x_L) + 2 \cdot (J-1) \tag{2}$$

At the same time, image data to be stored in the memory area 55 whose address is a value of the register ($x_H$, $x_L$) and image data to be stored in the memory area 55 whose address is the value of the register ($x_H$, $x_L$) plus one are read from the data part 51, and substituted in registers A, B.

$$A \leftarrow [x_H, x_L] \tag{3}$$

$$B \leftarrow [x_H, x_L] + 1 \tag{4}$$

Next, the contents which are stored in the registers A, B are transferred to memory areas of the display buffer part 53 whose addresses are a value of a register ($y_H$, $y_L$) and value of the register ($y_H$, $y_L$) plus one.

$$[y_H, y_L] \leftarrow A \tag{5}$$

$$[y_H, y_L] + 1 \leftarrow B \tag{6}$$

The symbols [$x_H$, $x_L$] and [$y_H$, $y_L$] express data which are stored in memory areas whose addresses are equal to the values of the registers ($x_H$, $x_L$) and ($y_H$, $y_L$), respectively.

Through this operation, image data which are stored in a (J−1)-th memory area 55 counted from the memory area 55 which corresponds to the display start address A2 of the data part 51 are stored in a memory area within the display buffer part 53 which corresponds to a position at which this data are displayed within the scroll area 84. Upon rewriting of the data which are stored in the (J−1)-th memory area, the sequence proceeds to a step b7 from the step b6.

At the step b7, 2 is added to the register ($y_H$, $y_L$) and the counter J for updating.

$$(y_H, y_L) \leftarrow (y_H, y_L) + 2 \tag{7}$$

$$J \leftarrow J + 2 \tag{8}$$

Upon updating of the register and the counter, the sequence proceeds to a step b8 to thereby judge whether the value of the counter J is larger than 2 m. In other words, of the blocks which are arranged in a row of the X-direction within the area 84c, whether data of the first to m-th blocks have been read is judged. If the value of the counter J is equal to or smaller than 2 m, the sequence returns to the step b6 to continue reading of the data of this row. If the value of the counter J is larger than 2 m and it is judged that reading of data of one row within the area 84c is completed, the sequence proceeds to a step b9 from the step b8.

At the step b9, one is added to the counter K which counts the number of rows for updating. The sequence then proceeds to a step b10. At the step b10, whether the value of the counter K is larger than a figure n which denotes the number of rows which can be displayed in the scroll area 84 is judged. When the value of the counter K is equal to or smaller than n rows, the sequence proceeds to a step b11 to thereby calculate and designate an address which corresponds to the start of the next row, based on the following formula:

$$(x_H, x_L) \leftarrow (x_H, x_L) + 2 \cdot (M-m) \tag{9}$$

Upon calculation and designation, the sequence returns to the step b5.

The second term (M−m) on the right-hand side expresses the number of memory areas which are arranged following the memory areas which have been read out at the steps b5 to b8, and reading of which is skipped. In other words, out of the data of the data part 51, only m memory areas corresponding to m blocks are sequentially read from M memory areas which correspond to one row of the virtual image 120. Hence, of image data corresponding to the new area 84c, m memory areas are read from the display start address A2, first. Next, after (M−m) memory areas are skipped, the image data are read out from m memory areas once again.

When it is judged at the step b10 that the counter K is larger than n, judging that reading of all data is completed, the operation in this flow chart is ended at a step b12.

In this manner, in the electric device 11, the display start address A1 is changed in accordance with a positional deviation, image data which are divided into blocks are sequentially read out, and partial data which are displayed in the scroll area 84 can be rewritten.

While data are read out in units of a character as character data in this flow chart, image data in units of a dot may be stored in each memory area of the data part 51, for instance, and such data may be read out. Further, rewriting of data is not limited to this particular method described above, but other method may be used.

FIG. 3 is a flow chart for describing a mode switching operation of switching the display mode and the edit mode during execution of the data processing function in the electric device 11 which is shown in FIG. 1.

When the data processing mode key 20 of the mode key group 16 of the electric device 11 is operated, the sequence proceeds to a step c2 from a step c1. At the step c2, whether a new inputting mode is selected is judged. The new inputting mode is a mode which uses data which are newly inputted, visually displayed from now and stored in the memory 44, as visual display data which are to be processed during data processing. Upon selection of the new inputting mode, the sequence proceeds to a step c3. When the new inputting mode is not selected, the sequence proceeds to a step c4. At the step c4, whether the edit mode is selected as the mode of the data processing is judged. In the edit mode, the data stored in the memory 44 is read out and visually displayed, and thereafter the correcting operation of newly inserting data or deleting data is performed. When the edit mode is selected, the sequence proceeds to the step c3. When the edit mode is not selected, the sequence proceeds to a step c5.

At the step c5, whether the display mode is selected as the mode of the data processing operation is judged. In the display mode, the data stored in the memory 44 are visualized into an image and visually displayed. When the display mode is selected, the sequence proceeds to a step c6 after the display image 71 of FIG. 6 is displayed in the display screen of the display apparatus 12. At the step c6, whether the switch button 80 is operated is judged. When the display mode is selected, the switch button 80 is formed by the touch area of the coordinate inputting apparatus 13 which is located immediately above the images 80a and 80b which are displayed in the display screen of the display apparatus 12. When the coordinates inputted from the coordinate inputting apparatus 13 are included in this touch area, it is judged that the switch button 80 is operated.

When the switch button 80 consisting of the image 80a which reads "EDIT MODE" is operated, it is judged that the edit mode is selected. That is, when the switch button 80 is operated in a condition where the display mode is selected, the mode is switched from the display mode to the edit mode. Upon operation of the switch button 80, the sequence returns to the step c4 from the step c6, to thereby perform an operation of the edit mode which will be described later.

When the switch button 80 is not operated, judging that an operation under the display mode is to be executed, the sequence proceeds to a step c7. At the step c7, scrolling based on the flow chart in FIG. 10 is executed. Upon one scrolling of an image, the sequence returns to the step c6 from the step c7. In this manner, once the mode is switched to the display mode, it is judged that the coordinates inputted from the coordinate inputting apparatus 13 instruct scrolling and scrolling is executed, until the switch button 80 is operated.

When it is judged at the steps c2 and c3 that the new inputting mode or the edit mode is designated, after visually displaying the display image 72 of FIG. 7, the sequence proceeds to the step c3. At the step c3, whether data input and correction operations are completed is judged. Whether the end button 77 indicating the end of an operation is operated in a condition where the display image 72 is displayed in the display screen of the display apparatus 12, for instance, is judged. When the end button 77 is not operated, the sequence proceeds to a step c8 from the step c3.

At the step c8, whether the switch button 80 which includes the image 80b reading "DISPLAY MODE" is operated is judged. In other words, when the switch button 80 is operated in a condition where the edit mode is selected, the mode is switched to the display mode from the edit mode. Upon operation, judging that switching to the display mode from the edit mode is instructed, the sequence proceeds to the step c6 from the step c8. When the switch button is judged to be operated, the sequence proceeds to a step c9.

At the step c9, data edit operation is performed. For example, the coordinate inputting apparatus 13 is used to instruct input of data, At this stage, whether coordinates are inputted from the coordinate inputting apparatus 13 is judged. When coordinates are inputted, a pattern which is drawn by a group of inputted coordinates is judged. If this pattern is a symbol having a predetermined shape or the like, a predetermined edit operation such as copying, pasting, cutting or the like of data is executed. If the inputted pattern is a pattern which corresponds to a character, the character corresponding to this pattern is inputted as data and stored in the buffer part 49 of the memory 44, to thereby update a display image in the display screen. This operation is so-called hand-writing input. Upon such edition, the sequence returns to the step a2 from the step c9.

At the step c3, when input and correction of data are judged to be completed, the sequence proceeds to a step c10 from the step c3, where an operation of ending edition of data is executed. To end edition, registration is performed so that image data of a modified image which is inputted to the electric device 11 in the new inputting mode and the edit mode and which is temporarily stored in the buffer part 49 of the memory 44 or the like are stored in the memory 44 as data which can be utilized for the data processing function. Upon edition of the data, the sequence proceeds to a step c11 from the step c10.

When any of the modes is not selected at the steps c2, c4 and c5, judging that an operation of other mode is selected, the sequence proceeds to the step c11 from the step c5. At the step c11, the operation of another mode selected is executed. Upon processing in the another mode at the step c12, the operation of this flow chart is ended at a step 12.

As described above, in the data processing function according to this embodiment, only by pressing the touch area of the switch button 80, it is possible to perform the operation of the display mode for scrolling, and the operations of the new inputting mode and edit mode for correcting partial data. Thus, scrolling according to this embodiment can be executed in a document creating apparatus which performs input and edition of data, for instance.

The display mode and the edit mode can be easily switched to each other, only by pressing the touch area of the switch button 80. Hence, when visual display data are inputted under the new inputting mode, data are corrected under the edit mode and remaining data other than partial data which are displayed in the display screen are to be referred to, the mode is easily switched to the display mode and scrolling of an image is executed. Further, when visual display data are referred to under the display mode and correction of the visual display data is to be executed, the mode is easily switched to the edit mode and the data are edited.

In addition, as shown in FIGS. 6 and 7, the displayed images 71, 72 which are displayed in the display screen of the display apparatus 12 when the display mode and the edit mode are selected are different from each other only regarding the images 80a, 80b of the switch button 80. Hence, even when the display mode and the edit mode are switched to each other, partial data which are visually displayed within the scroll area 84 of the display screen of the display apparatus 12 as the data image portion 73 are identical.

Therefore, by switching the mode, it is possible to prevent an inconvenience such as a failure to note a portion of data which is to be edited.

Thus, in the electric device 11 according to this embodiment, scrolling is executed only when the display mode is selected. Hence, when coordinates within the scroll area 84 are designated with the coordinate inputting apparatus 13, it is possible to distinguish whether the coordinates are coordinates which denote a designate point for scrolling or coordinates which denote an instruction during edit operation of data. This allows to use the same processing apparatus in order to realize the coordinate inputting apparatus for inputting coordinates within the scroll area 84 for the purpose of editing data during edition and the coordinate inputting apparatus for inputting coordinates for the purpose of designating a point for scrolling.

In the electric device 11 according to this embodiment, scrolling is executed based on a positional deviation of a point designated by a user from the reference point which is set within the scroll area 84 of the display screen of the display apparatus 12. This reference point 11 can be optionally set by a user.

Figure 14:
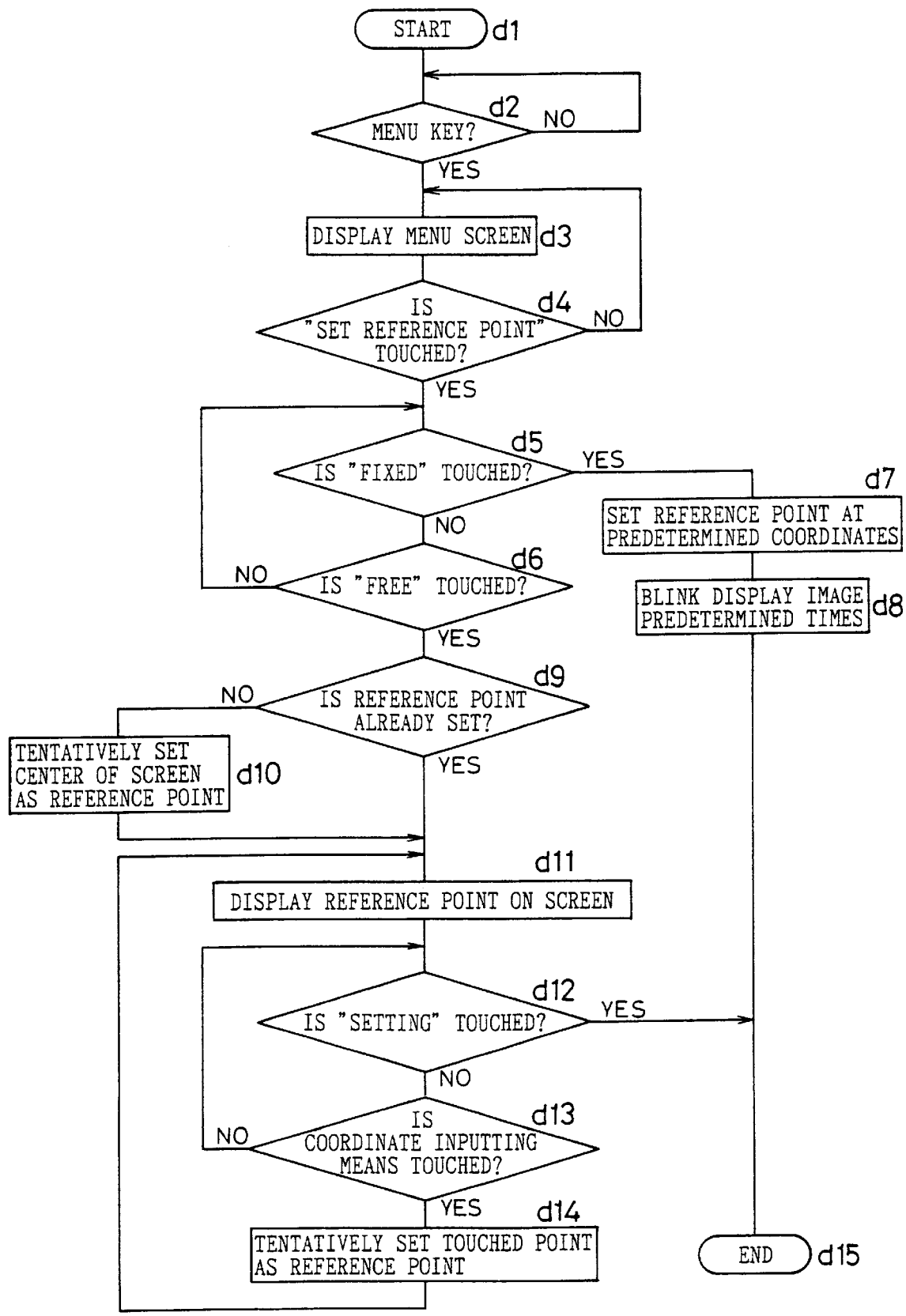
FIG. 14 is a flow chart for describing a reference point setting operation of setting a reference point within the scroll area in the electric device.

FIG. 14 is a flow chart for describing a reference point setting operation of setting the reference point within the scroll area 84 in the electric device 11 according to this embodiment. The electric device 11 according to this embodiment provides two points, one being a fixed point which is set in advance at shipping and the other being a set point which can be optionally set by a user, and therefore, a user can select whether to use the fixed point or the set point.

Figure 15:
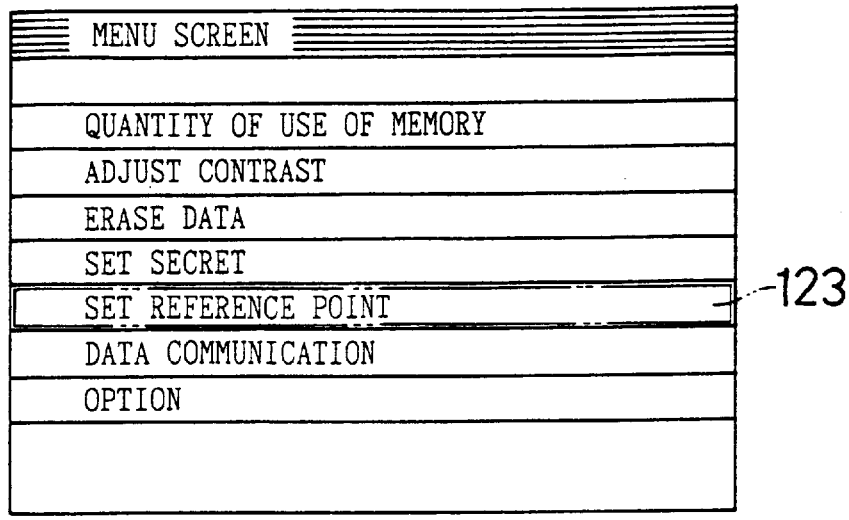
FIG. 15 shows a display image of a menu screen which is displayed during the reference point setting operation.

When the power source of the apparatus is switched to ON as a result of manipulation of the power source switch 14, the sequence proceeds to a step d2 from a step d1, to thereby judge whether the "MENU" key 25 of the function key group 17 of the electric device 11 is operated. When the menu key 25 is not operated, the sequence returns to the step d2. When the menu key 25 is operated, judging that execution of a menu operation is instructed, the sequence proceeds to a step d3 to display a display image 122 of the menu screen as that shown in FIG. 15 in the display screen of the display apparatus 12.

The menu operation is an operation to execute one optional operation which is selected by a user from a plurality of operations which are visually displayed in the menu screen. Operations which can be selected in the menu operation include an operation of displaying the quantity the memory 44 is used, and an operation of adjusting the contrast of the display screen of the display apparatus 12. Operations which can be selected in the menu operation include an operation of erasing visual display data which are stored in the memory 44, an operation of setting a password for displaying the visual display data, and an operation of prohibiting a display of the visual display data when there is no password. Further, operations under the menu operation include the reference point setting operation according to this flow chart.

The display image 122 of the menu screen includes an area 123 which is an image component for selecting the reference point setting operation. The area 123 reads "SET REFERENCE POINT" and is treated similarly to the buttons described earlier, together with the touch area of the coordinate inputting apparatus 13 which is located immediately above the area 123. Upon displaying the display image 122, the sequence proceeds to a step d4 from the step d3.

Figure 16:
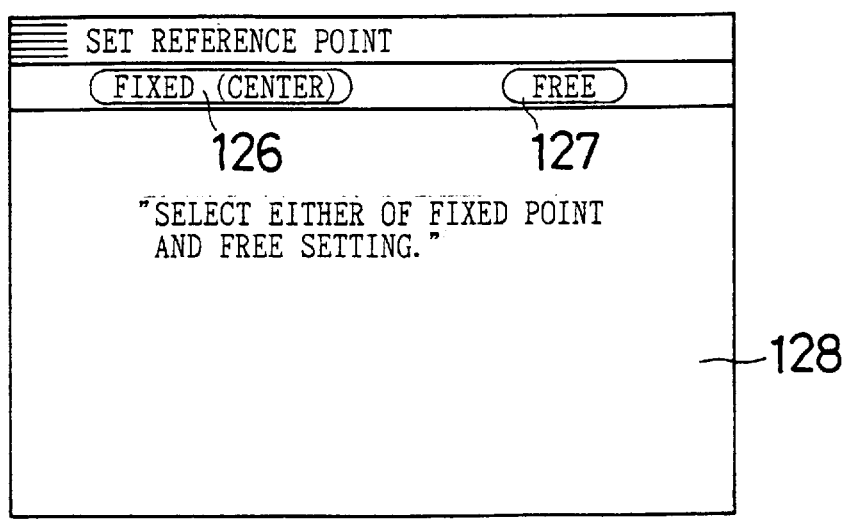
FIG. 16 shows a display image of a reference point setting screen which is displayed during the reference point setting operation.

At the step d4, whether the inputted coordinates are included in a touch area of the area 123 is judged. A state where the inputted coordinates are included in the touch area will be described as "The touch area is touched." In the following. When the touch area is touched, the sequence proceeds to a step d5, after the display image 125 on the reference point setting screen as shown in FIG. 16 is displayed on the display screen of the display apparatus 12. When the touch area is not touched, the sequence returns to the step d3.

A display image 125 includes the image of a fixed point designation button 126, the image of a set point setting button 127, and a reference point designation area 128. In this embodiment, it is assumed that the fixed point is set at the center of the screen. The image of the button 126 reads "FIXED (CENTER)." The image of the button 127 reads "FREE." The reference point designation area 128 shows a comment reading "SELECT EITHER OF FIXED POINT AND FREE SETTING" is displayed in the reference point designation area 128. A user operates either one of the fixed point designation button 126 and the set point setting button 127, and selects the fixed point or the set point.

Referring to FIG. 14 again, upon inputting coordinates through the coordinate inputting apparatus 13 after tie display image 125 is visually displayed, based on the coordinates which are inputted at the step d5, whether a touch area of the fixed point designation button 126 is touched is judged. When the touch area is judged to be not touched, the sequence proceeds to a step d6 from the step d5. At the step d6, whether a touch area of the set point setting button 127 is touched is judged. When it is judged that the touch area is not touched, the sequence returns to the step d5, and judging operation is repeated until the touch area of the button 126 or 127 is touched.

Figure 17:
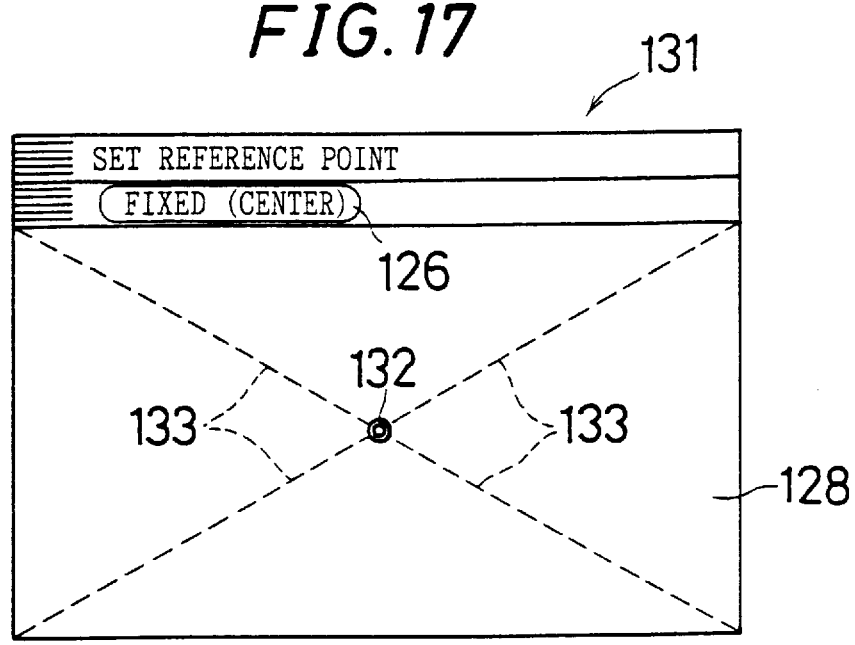
FIG. 17 shows a display image of the reference point setting screen which shows a fixed point which is displayed during the reference point setting operation.

When it is judged at the step d5 that the touch area of the fixed point designation button 126 is touched, the sequence proceeds to a step d7 from the step d5. At the step d7, the reference point is set at coordinates of a predetermined fixed point which is set the electric device 11 in advance. The sequence then proceeds to a step d8. At the step d8, a display image 131 as that shown in FIG. 17 is displayed in the display screen of the display apparatus 12.

The display image 131 includes the image of the fixed point designation button 126 and the reference point designation area 128. The display image 131 is an image in which the image of the set point setting button 127 is erased. In addition, in the reference point designation area 128 a character 132 which is an image component showing the position of the reference point which is set is drawn. An auxiliary line 133 is also drawn in the designation area 128. The auxiliary line 133 expresses that the character 132 is set at the center of figure of the designation area 128, i.e., at the center of figure of the scroll area 84 of the display screen of the display apparatus 12. The auxiliary line 133 is denoted in a dotted line, for example.

Further, the central processing unit 32 controls the display control means 33 so that the display image 131 is displayed as blinking display a predetermined number of times. Blinking display is an operation of keeping dots in the white color as they are and of switching the black color of dots in the black color to the white color display a plurality of times at predetermined time intervals when the display apparatus 12 is a monochrome display apparatus, for instance. That is, this is an operation of switching a condition where the image 131 is displayed and a condition where the display image is not displayed every predetermined time. By blinking the display image 131 in this manner, it is possible to show a user that the reference point is set at the position which is denoted by the character 132.

Referring to FIG. 14 again, when it is judged at the step d6 that the touch area of the set point setting button 127 is touched, the sequence proceeds to a step d9 from the step d6. At the step d9, whether a user has set a set point before which serves as the reference point which can be optionally set is judged. In other words, whether the reference point is already set is judged. When the reference point is not set, the sequence proceeds to a step d10 from the step d9, to thereby tentatively set a predetermined position, such as the center of screen, as the set point.

Figure 18:
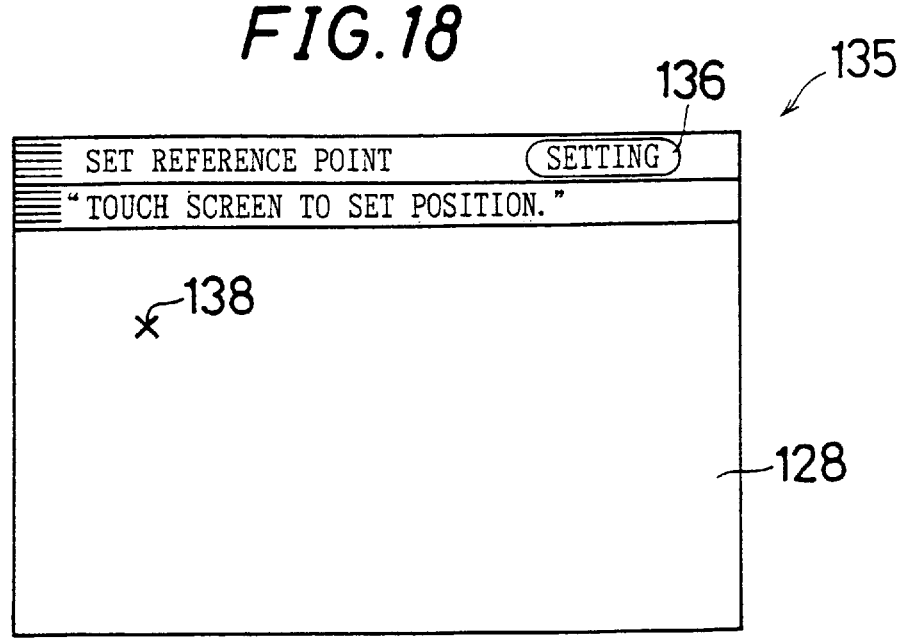
FIG. 18 shows a display image of the reference point setting screen which shows a set point which is displayed during the reference point setting operation.

When it is judged at the d9 that the set point is set in advance and when tentative setting of the set point at the step d10 is completed, the sequence proceeds to a step d11. At the step d11, the display image 135 of FIG. 18 is displayed in the display screen of the display apparatus 12. The display image 135 includes the reference point designation area 128 and the image of a setting button 136. In the designation area 128, the position of the set point of the reference point which is tentatively set by a predetermined character 138 which is expressed as "x", for example, is shown.

Referring to FIG. 14 again, upon setting the set point of the reference point, the sequence proceeds to a step d12 from the step d11, to thereby judge whether a touch area of the setting button 136 is touched. When it is judged that the touch area is not touched, the sequence proceeds to a step d13 to thereby judge whether the touch area of the reference point designation area 128 is touched. When it is judged that the touch area is not touched, the sequence returns to the step d12, and judgment is repeated until the touch areas of the designation area 128 and the setting button 136 are touched.

When the touch area of the designation area 128 is touched, the sequence proceeds to a step d14 from the step d13. At the step d14, determining that a point within the designation area 128 corresponding to coordinates which are inputted from the coordinate inputting apparatus 13 is coordinates of the set point of the reference point, tentative setting of the set point is updated. Upon tentative setting, the sequence returns to the step d11 from the step d14, to thereby display an image which shows the set point of the reference point which is newly tentatively set, in the display screen.

Figure 19:
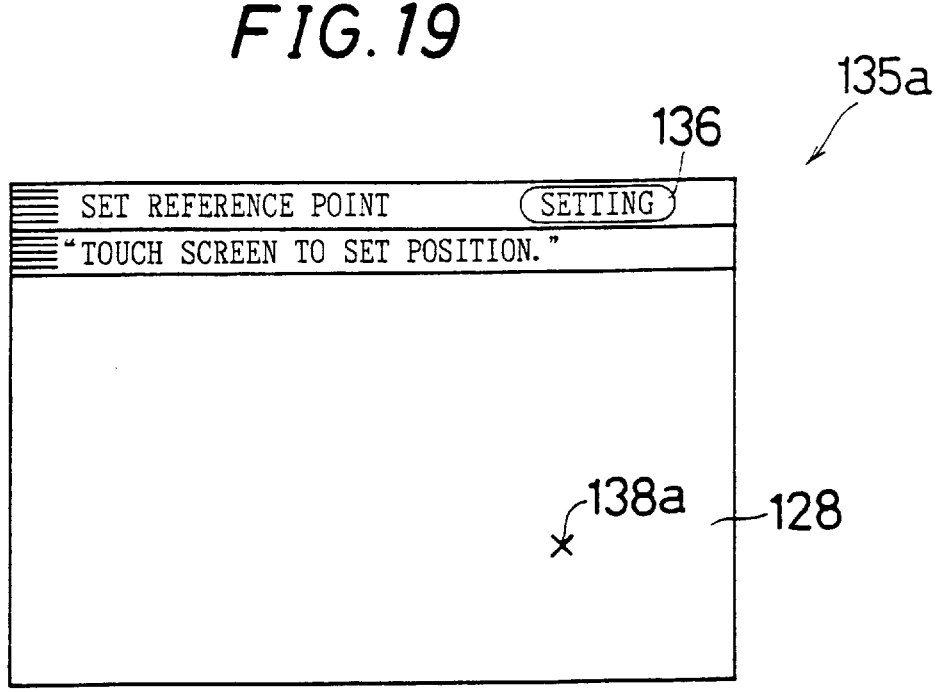
FIG. 19 shows a display image which is displayed on the display screen of the display apparatus, from a condition where the display image is displayed on the display screen to a condition where a point within a reference point designation area is inputted and the set point of the reference point is updated.

FIG. 19 shows a display image 135a which is displayed in the display screen of the display apparatus 12, in a condition where the set point of the reference point is updated after the display image 135 of FIG. 18 is displayed in the display screen. Within the reference point designation area 128 of the display image 135a, the image of the character 138 which used to be displayed within the reference point designation area 128 of the display image 135 is erased, and a character 138a which shows the position of the set point which is newly set is displayed. The character 138 and the character 138a are characters having the same shape.

Referring to FIG. 14 again, when it is judged at the step d12 that the touch area of the setting button 136 is touched, recognizing that the set point of the reference point at the position which is currently displayed in the display screen is set as the reference point, the sequence proceeds to a step d15, to thereby end the operation in this flow chart. When the fixed point of the reference point is set as the reference point as well, upon blinking display operation of the image at the step d8, the sequence proceeds to the step d15 from the step d8 to end the operation in this flow chart.

As described above, in the electric device 11 according to this embodiment, a user can optionally set the reference point which serves as the basis of scrolling at an optional position. Hence, in an apparatus for processing data by means of a plurality of windows, for instance, when the data processing function is to be used within one of the windows and the position at which the window is displayed is shifted in a portion of the display screen and is always constant, a user can optionally set a reference point which corresponds to the scroll area 84 which is set within an image of this window.

Now, an electric device according to a second embodiment of the present invention will be described. The electric device according to second embodiment has a similar structure to the electric device 11 according the first embodiment, and therefore, a redundant description will be omitted. In the electric device according to the second embodiment, when a point within the scroll area 84 of the display screen of the display apparatus is successively designated, scrolling of an image is successively executed.

Figure 20:
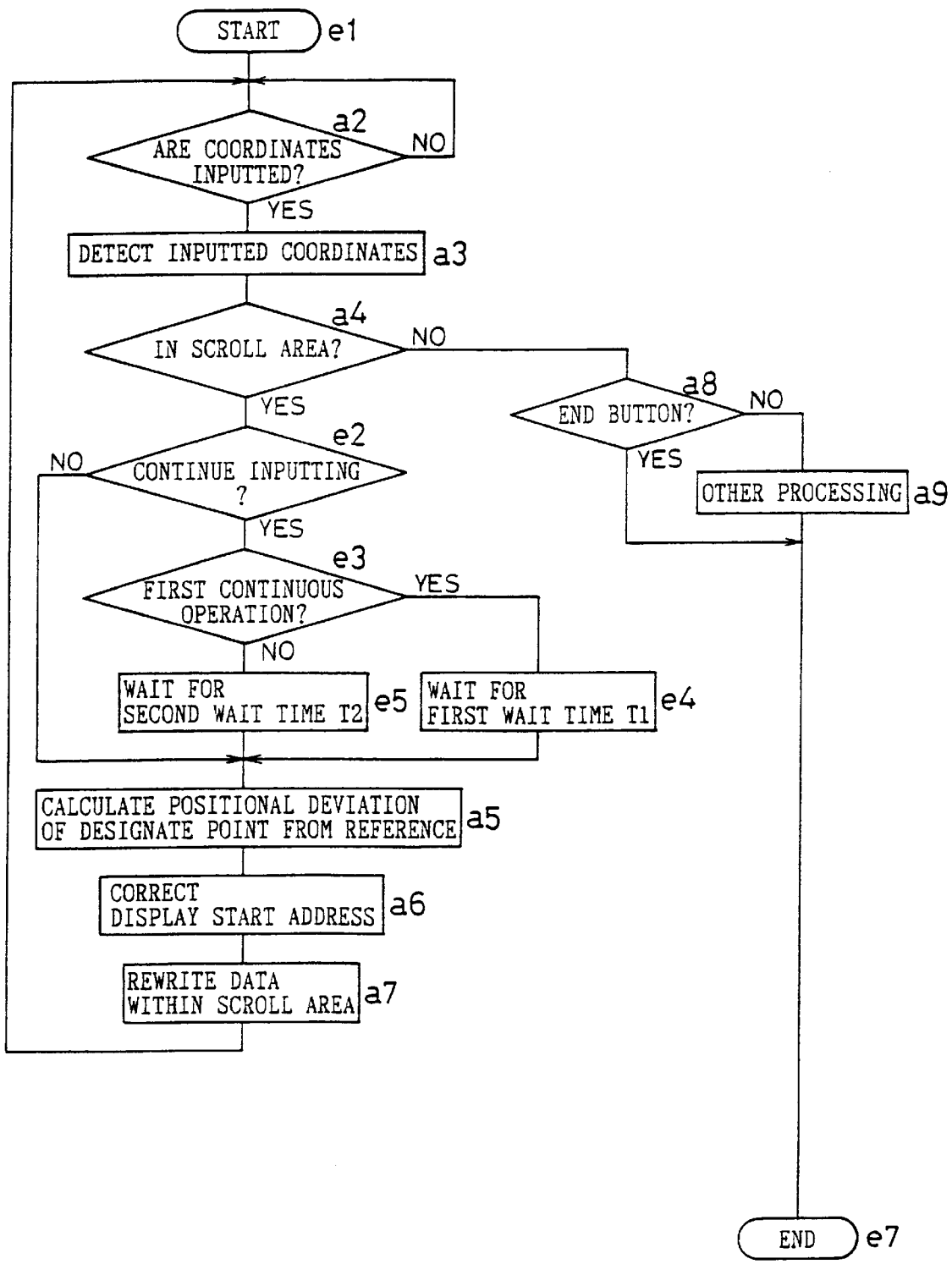
FIG. 20 is a flow chart for describing scrolling of an image which is executed in an electric device according to a second embodiment of the present invention, in a condition where the display mode of the data processing function is selected.

FIG. 20 is a flow chart for describing scrolling of an image which is executed in the electric device above, in a condition where the display mode of the data processing function is selected. The flow chart in FIG. 20 is similar to the flow chart in FIG. 10, and therefore, identical reference characters are assigned to steps at which identical operations are performed. A detailed description will be simply omitted.

When the data processing mode key 20 of the mode key group 16 of the electric device is operated and the display mode is selected sequentially, the sequence proceeds to the step a2 from a step e1. At the step a2, whether coordinates are inputted is judged. Upon input of coordinates, the inputted coordinates are detected at the step a3. At the step a4, whether the inputted coordinates are included in the scroll area 84 of the display screen of the display apparatus 13 is judged.

When the inputted coordinates are included in the scroll area 84, the sequence proceeds to a step e2 from the step a4. At the step e2, whether there is continued input of coordinates is judged. To input coordinates continuously, when the coordinate inputting apparatus 13 is a touch panel, for example, a user keeps pressing one point on the touch point with a pen 15. The central processing unit 32 detects a voltage change from the coordinate inputting apparatus 13, through the position detecting apparatus 31, for every few $\mu$ seconds. When the same voltage change is detected a plurality of times, the central processing unit 32 judges that coordinates are inputted once. If a voltage change is detected predetermined times which are greater than this, the central processing unit 32 judges that coordinates are inputted continuously.

When coordinates are judged to be inputted continuously, the sequence proceeds to a step e3 from the step e2. At the step e3, whether the judgment at the step e2 that coordinates are continuously inputted is a first one or not is judged. That is, when continuous input of coordinates is detected and continuous scrolling is selected, whether scrolling to be performed is the first scrolling is judged. When scrolling to be performed is the first scrolling, the sequence proceeds from the step e3 to a step e4 to suspend the operation for a first wait time t1 and enter a wait state. When scrolling to be performed is a second or the following scrolling, the sequence proceeds from the step e3 to a step e5 to suspend the operation for a second wait time t2 and the wait state is entered. The first wait time t1 is longer than the second wait time t2. For example, the first wait time t1 is 0.5 second, while the second wait time t2 is 0.1 second.

After the predetermined wait time since the operation is suspended at the step e4 and the step e5, the sequence proceeds to the step a5 to calculate a positional deviation of the designate point from the reference point. Upon calculation, the sequence proceeds to the step a6 to correct the display start address A1. At the step a7, partial data displayed in the scroll area 84 of the display screen are rewritten. Upon rewriting of the data, the sequence returns to the step a2.

When at the step a4, the inputted coordinates are judged to be outside the scroll area 84, the sequence proceeds to the step a8 to judge whether the end button 77 is operated. When the end button 77 is operated, the operation in this flow chart is ended at a step e7. When the end button 77 is not operated, the sequence proceeds to the step a9 from the step a8. At step 9, after other processing corresponding to the position of the inputted coordinates is completed, at the step e7, the operation in this flow chart is ended.

As described above, in the electric device of this embodiment, when coordinates are continuously inputted, scrolling is executed continuously. More specifically, when there is continued input of coordinates, e.g., when the pen 15 keeps pressing down the coordinate inputting apparatus 13 which is a touch panel, scrolling is executed continuously until the pen 15 leaves the coordinate inputting apparatus 13.

For example, it is assumed that pressing of the coordinate inputting apparatus 13 is continued in a condition where the designate point 112 of the image 72 shown in FIG. 6 is designated to perform scrolling and the display image 115 is displayed in the display screen of the display apparatus 12. In this case, in the device 11, the data image portion 116 is scrolled once again so that an image component of the image part 116 which includes a point which corresponds to the designate point 112, i.e., "O" in this embodiment, is moved to a position coinciding to the reference point 111, as shown in FIG. 9. In the data image portion of the display image after scrolling, the image component "O" which includes a point which used to correspond to the designate point 112 in the image portion 116 before scrolling is moved to a position at which the image component "C" used to be drawn in the image portion 116.

That is, by pressing one point in the touch panel, an image is scrolled continuously from the point at which the touch panel is pressed in a direction toward the reference point, at a false speed which is in proportion to a distance between the reference point and the pressing point. Thus, in the electric device according to this embodiment, it is possible to perform continuous scrolling.

Further, in the coordinate inputting apparatus 13, it is possible to change coordinates to be inputted while keep entering coordinates. This operation is realized by moving the pen 15 while pressing the coordinate inputting apparatus 13, i. e., a touch panel, with the pen 15, for instance. When coordinates to be inputted are changed while continuously inputting coordinates in this manner, it is possible to change a positional deviation of the designate point from the reference point while continuously executing scrolling. This makes it possible to change the false speed which is felt by a user, by moving the pen 15. It is also possible to change the direction of scrolling.

Still further, in the electric device of this embodiment, in continuous processing of scrolling the wait time of the first scrolling is longer than that of subsequent scrollings, in continued scrolling. This improves the operability of continued scrolling.

Now, an electric device according to a third embodiment of the present invention will be described. The electric device according to third embodiment has a similar structure to the electric device 11 according the first embodiment, and therefore, a redundant description will be omitted. In the electric device according to the third embodiment, continued scrolling is executed, and the second wait time t2 which is an interval for scrolling is shortened by a predetermined time.

Figure 21:
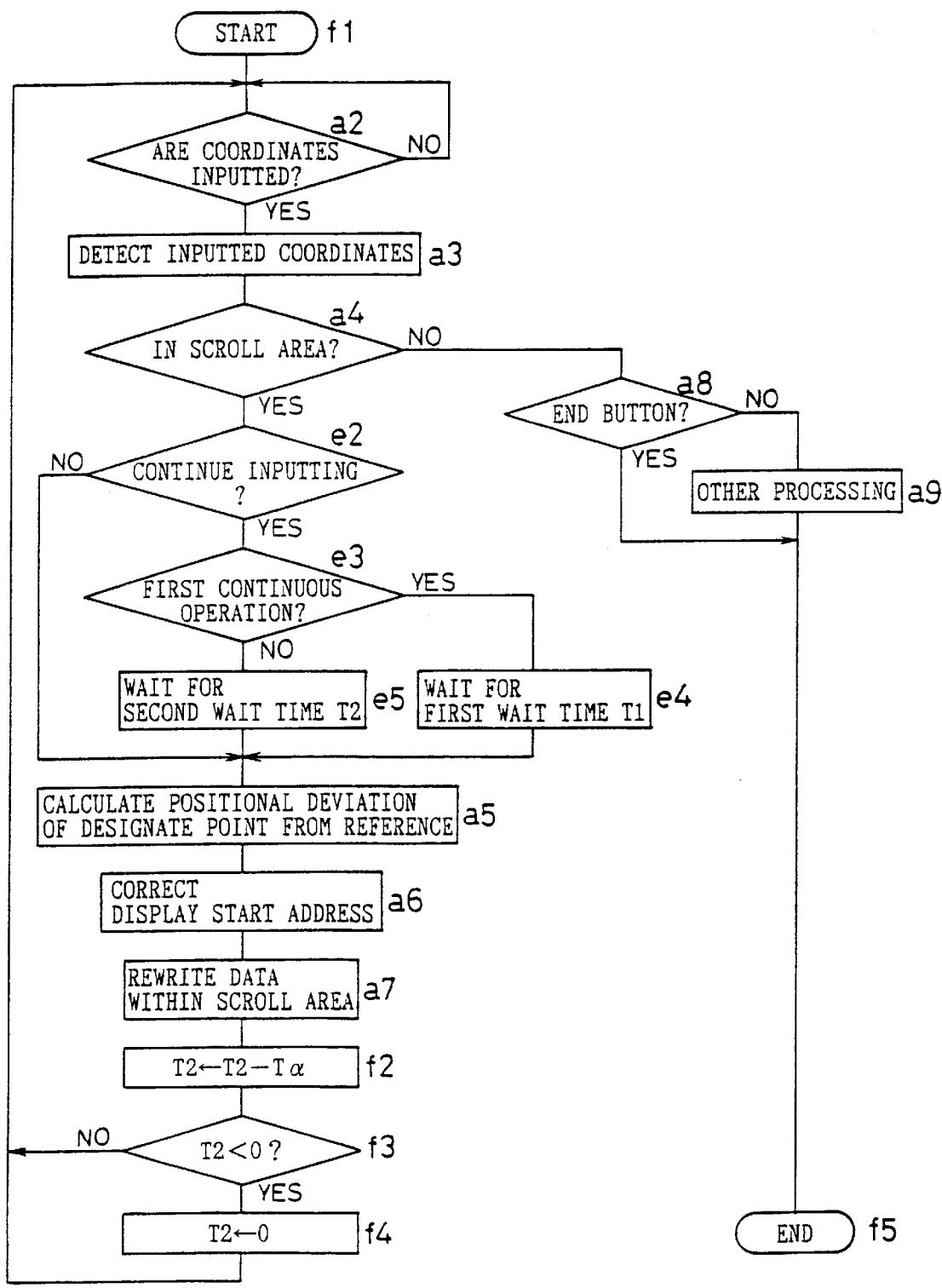
FIG. 21 is a flow chart for describing scrolling of an image which is executed in an electric device according to a third embodiment of the present invention, in a condition where the display mode of the data processing function is selected.

FIG. 21 is a flow chart for describing scrolling of an image which is executed in the electric device above, in a condition where the display mode of the data processing function is selected. The flow chart in FIG. 21 is similar to the flow charts in FIGS. 10 and 20, and therefore, identical reference characters are assigned to steps at which identical operations are performed. A detailed description will be simply omitted.

When the data processing mode key 20 of the mode key group 16 of the electric device is operated and the display mode is selected consequently, the sequence proceeds to the step a2 from a step f1. At the step a2, whether coordinates are inputted is judged. Only when coordinates are inputted, the sequence proceeds to the step a3 to thereby detect the inputted coordinates. Upon detection, at the step a4, whether the inputted coordinates are included in the scroll area 84 is judged.

When the inputted coordinates are included in the scroll area 84, the sequence proceeds to a step e2 to judge whether coordinates are inputted continuously. When coordinates are continuously inputted, at a step e3, whether the continuous input of coordinates is the first continuous input is judged. When the continuous input of coordinates is the first, at a step e3, the operation is suspended for the first wait time t1 and the wait state is entered. When the continuous input of coordinates is the second or subsequent entry, the operation is suspended for the second wait time t2 and the wait state is entered. When there is not continued input of coordinates, the sequence proceeds to the step a5. Alternatively, after a predetermined wait time, the sequence proceeds to the step a5.

At the step a5, a positional deviation of the designate point from the reference point is calculated. Upon calculation, at the step a6, the display data are corrected. At the step a7, partial data displayed in the scroll area 84 of the display screen are rewritten. Upon rewriting of the data, the sequence proceeds to a step f2 from the step a7.

At the step f2, the second wait time t2 is updated on the basis of the following formula:

$$t2 \leftarrow t2 - t\alpha \qquad (10)$$

The symbol tα is a predetermined subtraction time. The subtraction time tα is set as 0.01 second, for example. In other words, at the step f2, the second wait time t2 is shortened by the subtraction time tα and updated. Upon updating the second wait time t2, the sequence proceeds to a step f3.

At the step f3, whether the updated second wait time t2 is smaller than 0 is judged. The second wait time t2 is a wait time during which scrolling is temporarily suspended. Hence, the second wait time t2 cannot be a negative value. Considering this, at the step f3, whether the second wait time t2 has a negative value is judged. When the updated second wait time t2 is smaller than 0, the sequence proceeds to a step f4 from the step f3, to substitute 0 in the second wait time t2 and update the second wait time t2. This is, when shortest, the second wait time t2 is 0 second. Upon updating the second wait time t2, the sequence returns to the step a2 from the step f4. The sequence returns to the step a2 also when the wait time t2 is judged at the step f3 to be equal to or larger than 0.

When the inputted coordinates are judged at the step a4 to be not included in the scroll area 84, the sequence proceeds from the step a4 to the step a8 to judge whether the end button 77 is operated. When the end button 77 is not operated, after performing another processing corresponding to the coordinates which are inputted at the step a9, the operation in this flow chart is ended it the step f5. When the end button 77 is operated as well, the operation in this flow chart is ended at the step f5.

As described above, according to this embodiment, during execution of continuous scrolling, intervals for repeating scrolling are shortened by the predetermined subtraction time tα. Hence, when scrolling is to be continued a number of times, it is possible to improve the false speed of scrolling an image.

Now, an electric device according to a fourth embodiment of the invention will be described. The electric device of the fourth embodiment has a similar structure to the electric device 11 according the first embodiment, and therefore, a redundant description will be omitted. In the electric device according to the fourth embodiment, a positional deviation of the designate point from the reference point is approximated to an integer-multiple of a predetermined unit image such as a character.

Figure 23A:
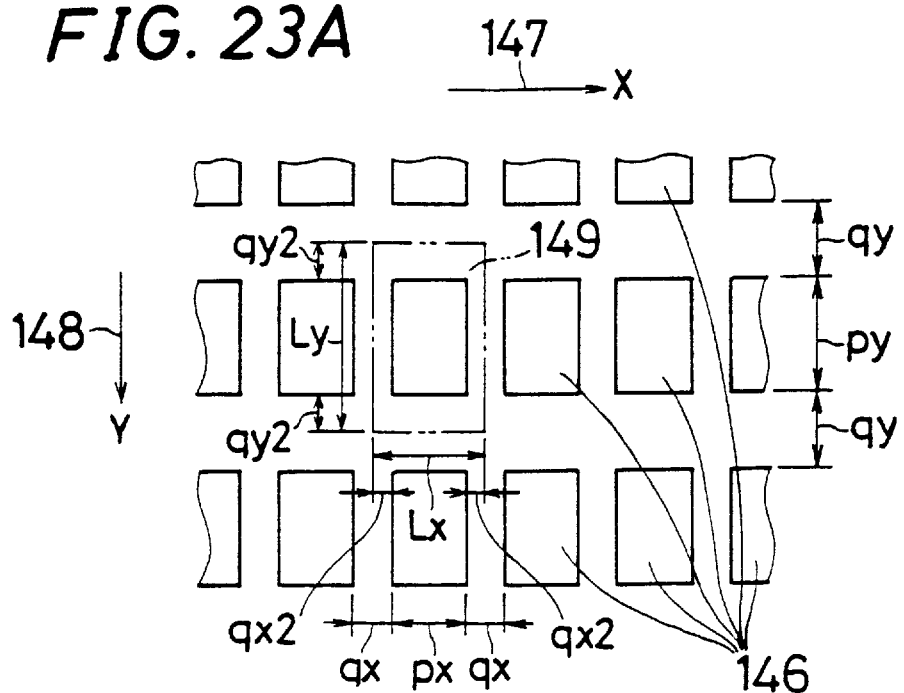
FIG. 23A is a schematic diagram showing a virtual image, which is obtained by visualizing visual display data into an image, displayed in the electric device according the fourth embodiment of the present invention.

FIG. 23a is a schematic diagram partially expanding the display screen of the display apparatus when a data image portion of a display image is visually displayed in the electric device above. Visual data to be visually displayed in the display screen are character data which are comprised of characters. For example, the visual display data are comprised of codes which denote characters. In a virtual image of the visual display data, an image of a character which serves as an image component is drawn using an area which has the same size for all characters. That is, the image of each character is an image of a so-called equal-width font. It is assumed that a portion of this virtual image is displayed in the display screen of the display apparatus 12, as a data image portion. At this stage, partial data of the visual display data are visually displayed in the display screen, so that the images of characters which are set corresponding to the respective characters are each displayed within rectangular regions 146 which are disposed in the form of a matrix.

The rectangular regions 146 are arranged in the form of a matrix, with a gap between each other, in the X-direction and the Y-direction which are orthogonal to each other. For example, the rectangular regions 146 are arranged in the X-coordinate axis direction which is denoted by an arrow 147, with a predetermined gap qx between each other, and then in the Y-coordinate axis direction which is denoted by an arrow 148, with a predetermined gap qy between each other. The rectangular regions 146 have predetermined widths Px, Py in the X-direction and the Y-direction.

In the electric device of the fourth embodiment, positional deviations of the designate point from the reference point in X-coordinate and Y-coordinate are approximated to integer-multiples of the widths Lx, Ly of a unit display region 149 in the X-direction and the Y-direction. The unit display region 149 includes the rectangular regions 146, and has a size considering the gaps qx, qy which are created between the rectangular regions 146. That is, the unit display region 149 is a region which is obtained by adding a space whose widths qx2, qy2 are half the gaps qx, qy to the periphery of each rectangular region 146.

Figure 23B:
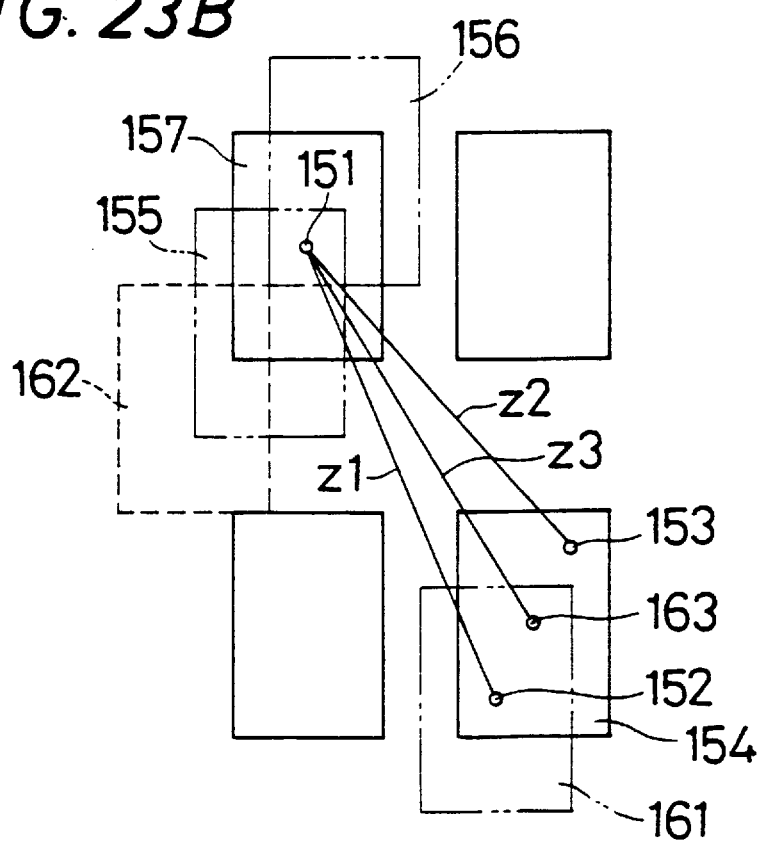
FIG. 23B is a partially expanded view of a diagram which shows a virtual image.

A user designates an optional point within the scroll area 84 as a designate point. At this stage, as shown in FIG. 23b, different points in one and the same rectangular region may be designated as designate points 152, 153.

Positional deviations z1, z2 of the designate points 152, 153 from the reference point 151 clearly have different values and directions from each other. Hence, the directions and the quantities of scrolling are also different. For instance, when the designate point 152 is designated, an image component of a rectangular region 154 which includes the designate points 152, 153 is scrolled to a position which is denoted in an alternate long and two short dashes line 155. Meanwhile, when the point 153 is designated, the image component of the rectangular region 154 is scrolled to a position which is denoted in an alternate long and two short dashes line 156.

In this manner, when points within the same rectangular region 154 are designated as designate points, if coordinates of the designate points are different from each other, positions of an image component becomes different before and after scrolled. When a rectangular region 157 is a region which includes a reference point 151, only when the positions of the designate points within the rectangular region 154 are in the same positional relationship with that of the position of the reference point 151 within the rectangular region 157, an image is scrolled in such a manner that an image component which is displayed within the rectangular region 154 is displayed at a position which coincides with the rectangular region 157.

When the positional relationship between the points within the rectangular regions 154, 157 is displaced, the positional relationship between the edge portion of the display screen and the image component after scrolled is displaced from the positional relationship with the image component before scrolled. For instance, in some cases, the lengths of the scroll area 84 in the X-direction and the Y-direction of the display screen of the display apparatus 12 are set as integer-multiples of the widths Lx, Ly of the unit display region 149 so that a part of an image of a character which is an image component is not lacked at the edge portion of the display screen. In such a condition, if scrolling of an image as described in the first to the third embodiments is executed, a part of the image of the character may be lacked at the edge portion of the display screen.

In the electric device of the fourth embodiment, the magnitude of a positional deviation of the designate point from the reference point is approximated to integer-multiples of the widths Lx, Ly of the unit display region 149 in the X-direction and the Y-direction. It is assumed that the reference point 151 is set at the center of figure of the unit display region 149 including the rectangular region 157, for example, as shown in FIG. 23b. When the designate points 152, 153 are designated, in this case, positional deviations of the designate points 152, 153 from the reference point 151 are both approximated to a positional deviation z3 of the center of figure 163 of the unit display region including the rectangular region 154 from the reference point 151.

Figure 22:
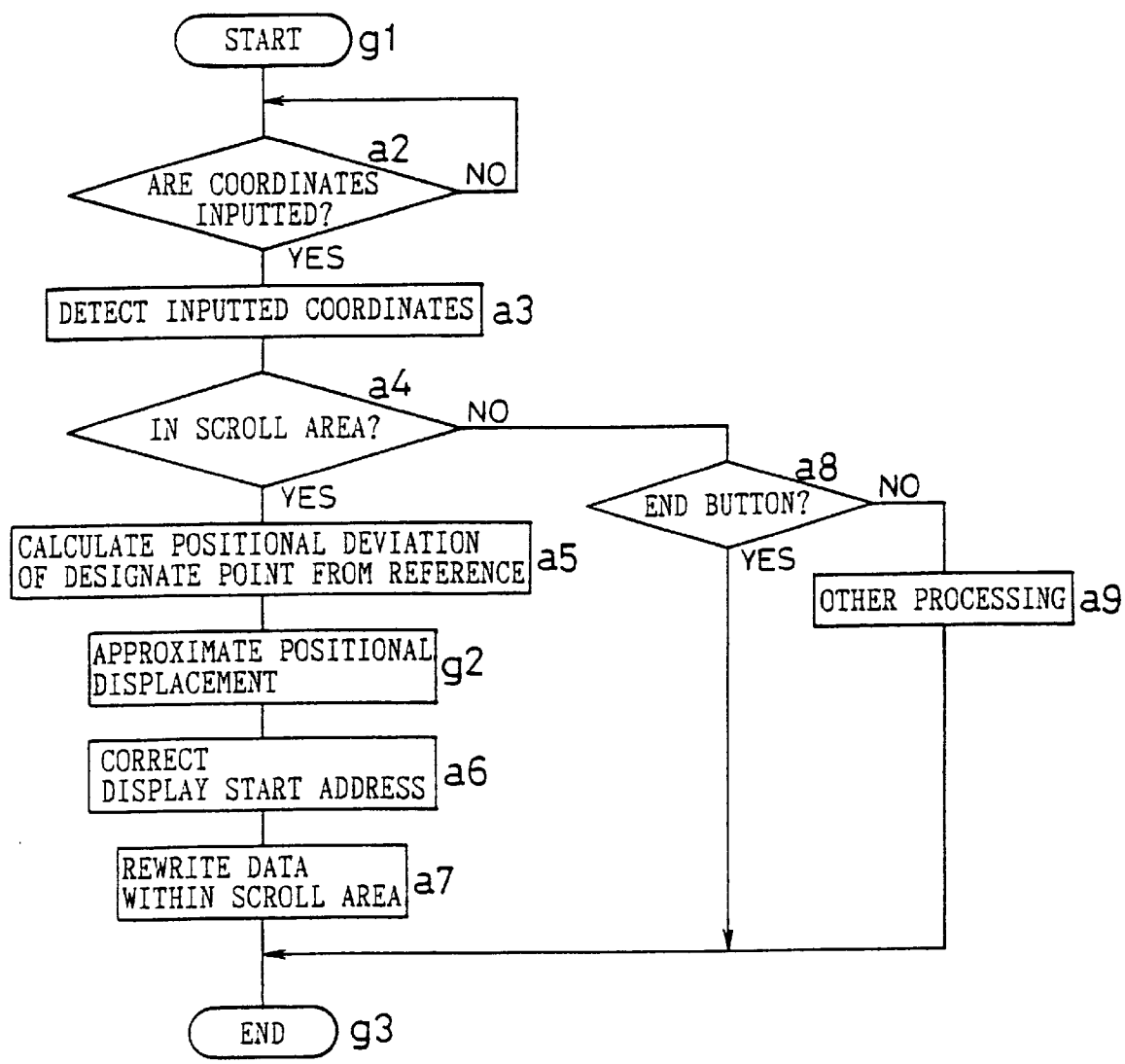
FIG. 22 is a flow chart for describing scrolling of an image which is executed in an electric device according to a fourth embodiment of the present invention, in a condition where the display mode of the data processing function is selected.

FIG. 22 is a flow chart for describing scrolling of an image which is executed in the electric device mentioned above, in a condition where the display mode of the data processing function is selected. The flow chart in FIG. 22 is similar to the flow chart in FIG. 10, and therefore, identical reference characters are assigned to steps of identical operations. A detailed description of previously discussed steps will be omitted.

When the data processing mode key of the mode key group of the electric device is operated and the display mode is selected, the sequence proceeds to the step a2 from a step g1. At the steps a2 to a4, coordinates of a designate point which is designated by a user are found. Then at the step a5, a positional deviation of the designate point from the reference point is calculated. Upon calculation, the sequence proceeds to a step g2 from the step a5.

At the step g2, as described above the positional deviation of the designate point from the reference point is approximated to integer-multiples of the widths Lx, Ly of the unit display region 149 in the X-direction and the Y-direction. Upon calculation of approximating the deviation, the sequence proceeds to the step a6 from the step g2, to thereby correct the display start address A1 which is displayed using the approximated positional deviation of the designate point from the reference point. Further, based on the display start address A1 which is corrected partial data displayed in the scroll area 84 are rewritten at the step a7. Upon rewriting of the data, the sequence proceeds to a step g3 to end the operation.

When the inputted coordinates are not included in the scroll area 84, whether the end button 77 is operated is judged at the step a8. When the end button 77 is operated, the operation in this flow chart is ended at the step g3. When the end button 77 is not operated, after performing other processing based on the inputted coordinates, the operation is ended at the step g3.

Figure 24:
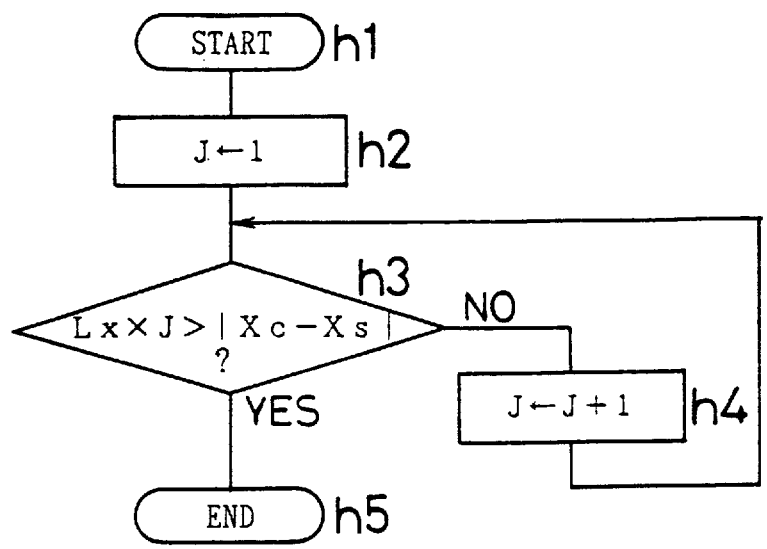
FIG. 24 is a flow chart for describing an X-direction approximating operation for approximating a deviation of coordinates in an X-direction, of computation of an approximate value of a positional deviation at a step g2 in the flow chart in FIG. 22.

FIG. 24 is a flow chart for describing an X-direction approximating operation for approximating a deviation of coordinates in the X-direction, of computation of an approximate value of a positional deviation at the step g2 in the flow chart in FIG. 22.

Upon calculation of the positional deviation between the reference point and the designate point at the step a5, the sequence proceeds to a step h2 from a step h1. At the step h2, 1 is substituted in the counter J which counts multiples of the width Lx of the unit display region 149 in the X-direction, for initialization. The sequence then proceeds to a step h3 from the step h2, to thereby judge whether a value which is obtained by multiplying the width Lx of the X-direction by an integer which is stored in the counter J is larger than the absolute value of the positional deviation of the X-direction.

$$Lx \times J > |Xc-Xs| \qquad (11)$$

The left-hand side (Lx×J) of the formula above is a calculated approximate value of the X-direction. The right-hand side |Xc−Xs| of the formula above is the absolute value of the positional deviation of the X-direction. When it is judged that the calculated value (Lx×J) of the X-direction is equal to or smaller than the absolute value |Xc−Xs| of the positional deviation of the X-direction, the sequence proceeds to a step h4 from the step h3. After adding "1" to the count of the counter J and updating the counter J, the sequence returns to the step h3. In other words, comparison of the calculated value and the absolute value is repeated until the calculated value (Lx×J) of the X-direction becomes larger than the absolute value |Xc−Xs| of the positional deviation of the X-direction.

When it is judged that the calculated value (Lx×J) of the X-direction is larger than the absolute value |Xc−Xs| of the positional deviation of the X-direction, determining that this calculated value is an approximate value of the positional deviation in the X-direction, the sequence proceeds to a step hS from the step h3, to thereby end the operation in this flow chart.

That is, the approximate value of the positional deviation in the X-direction is calculated by calculating an integer J which is expressed by the formula below and multiplying the width Lx of the unit display region 149 in the X-direction by the value J.

$$Lx \times (J-1) < |Xc-Xs| < Lx \times J \qquad (12)$$

Meanwhile, the sign of the approximate value of the positional deviation in the X-direction is the same as that of the positional deviation in the X-direction.

Figure 25:
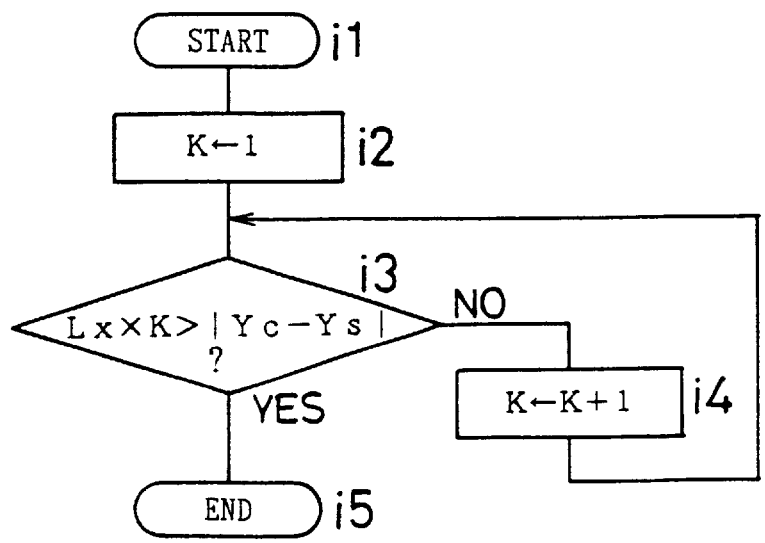
FIG. 25 is a flow chart for describing a Y-direction approximating operation for approximating a deviation of coordinates in a Y-direction, of computation of an approximate value of a positional deviation at the step g2 in the flow chart in FIG. 22.

FIG. 25 is a flow chart for describing a Y-direction approximating operation for approximating a positional deviation in the Y-direction at the step g2 in the flow chart in FIG. 22. The flow chart in FIG. 25 is similar to the flow chart in FIG. 24.

Upon calculation of the positional deviation of the designated point from the reference point, the sequence proceeds to a step i2 from a step i1. After substituting "1" to the counter K and initializing, the sequence proceeds to a step i3. At the step i3, an approximate value of a positional deviation in the Y-direction is calculated based on the formula (4).

$$Ly \times K > |Yc-Ys| \qquad (13)$$

In short, comparison of the calculated value and the absolute value is repeated until the value of a calculated value (Ly×K) of the approximate value of the positional deviation in the Y-direction becomes larger than the absolute value |Yc−Ys| of the positional deviation in the Y-direction. When the calculated value (Ly×K) is equal to or smaller than the absolute value |Yc−Ys|, the sequence proceeds to a step i4 from the step i3. After adding "1" to the count of the counter K and updating, the sequence proceeds to the step i3. When the calculated value (Ly×K) of the Y-direction becomes larger than the absolute value |Yc−Ys| of the positional deviation in the Y-direction, determining that the calculated value is the approximate value of the positional deviation in the Y-direction, the sequence proceeds to a step i5 from the step i3 to end the operation in this flow chart.

That is, the approximate value of the positional deviation in the Y-direction is a value which is expressed by the following formula:

$$Ly \times (K-1) < |Yc-Ys| < Ly \times K \qquad (14)$$

As described above, according to this embodiment, as the approximate values of the positional deviations of the designate point from the reference point in the X-direction and the Y-direction, a value is adopted which is closest the absolute values among values which are larger than the absolute values of the positional deviations in the X-direction and the Y-direction.

Further, as shown in the formulas (12) and (14) above, as the approximate value of the positional deviation, there is a value which is closest to the absolute value among values which are smaller than the absolute values of the positional deviation. In other words, among the approximate values (Lx×(J−1)), (Lx×J), (Ly×(K−1)), (Ly×K) shown in the formulas (12) and (14), a value which is closer to the absolute values of the positional deviation |Xc−Xs|, |Yc−Ys| may be adopted as the approximate value of the positional deviation.

In this case, in the flow charts in FIGS. 22 and 23, between the processing at the step h3 and the processing at the step h5 and between the processing at the step i3 and the processing at the step i5, after performing an operation of judging which one of the two approximate values is closer to the absolute values of the positional deviation, the operation in this flow chart is ended. To judge which one of the two approximate values is closer to the absolute values of the positional deviation, difference values between the approximate values and the absolute values of the positional deviation are calculated and a smaller one of the difference values is adopted as the approximate value.

As described above, according to this embodiment, a positional deviation of the designate point from the reference point is approximated to an integer-multiple of the widths of the unit display region in the X-direction and the Y-direction, and an image is scrolled based on the approximate value. Hence, when an image which includes character data, for instance, is visually displayed, it is possible to execute scrolling in units of a character.

Now, an electric device according to a fifth embodiment of the present invention will be described. The electric device of the fifth embodiment has a similar structure to the electric device 11 of the first embodiment, and therefore, a redundant description will be omitted. In the electric device of the fifth embodiment, continuous scrolling is executed and a positional deviation of the designate point from the reference point is approximated to an integer-multiple of the widths of the unit display region in the X-direction and the Y-direction.

Figure 26:
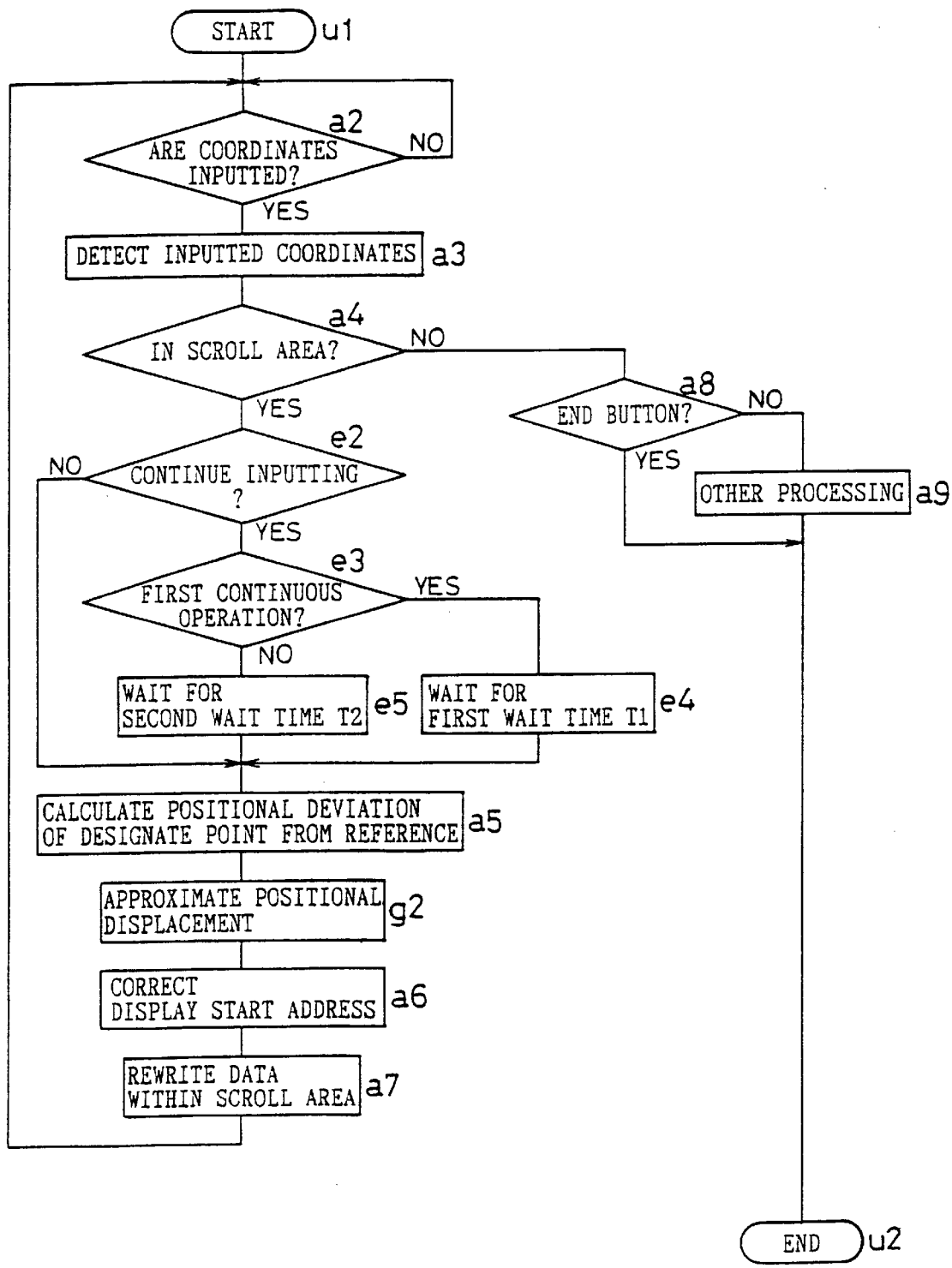
FIG. 26 is a flow chart for describing scrolling of an image which is executed in an electric device according to a fifth embodiment of the present invention, in a condition where the display mode of the data processing function is selected.

FIG. 26 is a flow chart for describing scrolling of an image which is executed in the electric device according above, in a condition where the display mode of the data processing function is selected. The flow chart in FIG. 26 is similar to the flow charts in FIGS. 10, 20 and 22, and therefore, identical reference characters are assigned to steps at which identical operations are performed. A detailed description of previously discussed steps will be simply omitted.

In the electric device, when the data processing mode key of the mode key group of the electric device is operated and the display mode is selected, the sequence proceeds to the step a2 from a step u1. When it is judged that coordinates which are inputted of a designate point at the steps a2 to a4, the sequence proceeds to a step e2 from the step a4. At the steps e2 to e5, continuous scrolling is executed and suspended for a predetermined wait time.

After the predetermined wait time has elapsed, the sequence proceeds to the step a5 to calculate a positional deviation of the designate point from the reference point. Upon calculation of the positional deviation, the sequence proceeds to the step g2 to calculate an approximate value of the positional deviation on the basis of the flow charts in FIGS. 24 and 25. Upon calculation of the approximate value, after correcting the display start address A1 at the step a6 using the approximate value as the positional deviation, data displayed in the scroll area 84 are rewritten at the step a7 on the basis of the corrected display start address. Upon rewriting of the data, the sequence returns to the step a2 from the step a7.

When it is judged at the steps a2 to a4 that the inputted coordinates are not of a designate point, whether the end button is operated is judged at the step a8. When the end button is operated, the operation is ended at the step u2. When the end button is not operated, after performing other processing at the step a9 on the basis of the inputted coordinates, the operation is ended at the step u2.

As described above, when the positional deviation is approximated in a condition where character data are displayed, as a result of one scrolling, the arrangement of the edge portion of the scroll area 84 and image components of the images of characters is displaced from the arrangement before scrolling. Since the arrangement of the image components is gradually displaced during continuous scrolling, a displacement of the arrangement becomes larger.

For instance, as shown in FIG. 23b, when an image component of the rectangular region 154 is moved to the area 155 denoted by the alternate long and two short dashed line as a result of the first scrolling, an image component of a rectangular region (not shown) which was displayed below the rectangular region 154 to the right-hand side is moved to a position denoted by an alternate long and two short dashes line 161. Scrolling for the second time moves the image component displayed in the area 155 to an area 162 which is denoted by a dotted line. Hence, when the positional deviation is not approximated during continuous scrolling, the position at which the image component is displayed is displaced every time scrolling is executed. This gives a user an illusion that the image of a character which is the image component is moved in a diagonal direction to the left-hand side. To prevent this, it is preferable to always keep an arrangement of an area which displays the image component. By approximating the positional deviation to the width of the unit display region during continuous scrolling, it is possible to always keep this arrangement.

Now, an electric device according to a sixth embodiment of the present invention will be described. The electric device of the sixth preferred embodiment has a similar structure to the electric device 11 of the first embodiment, and therefore, a redundant description will be omitted. In the electric device of the sixth preferred embodiment, continuous scrolling is executed, the wait time t2 for scrolling is shortened every time scrolling is executed while at the same time approximating the positional deviation of the designate point from the reference point to integer-multiples of the widths of the unit display region 149 in the X-direction and the Y-direction.

Figure 27:
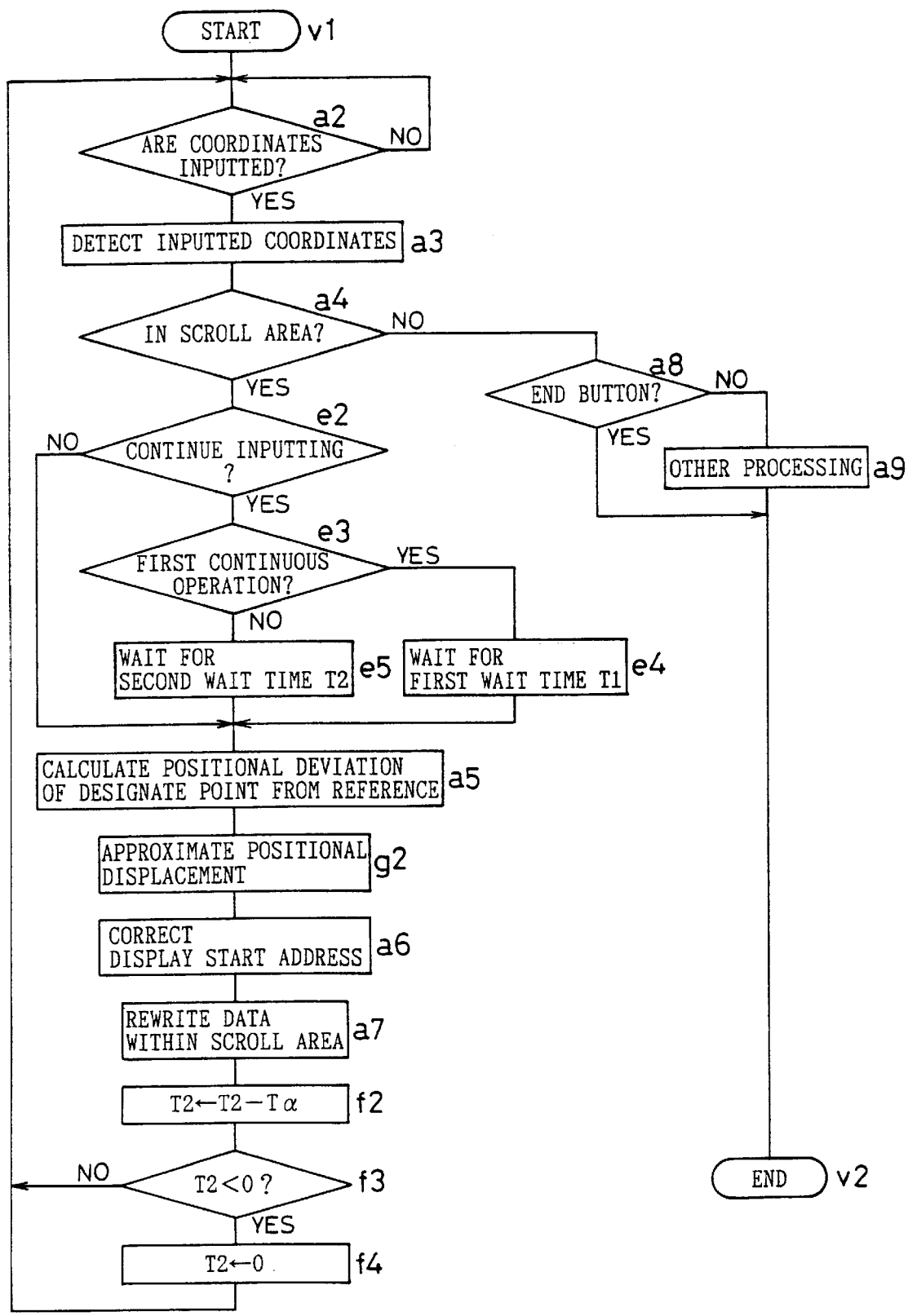
FIG. 27 is a flow chart for describing scrolling of an image which is executed in an electric device according to a sixth embodiment of the present invention, in a condition where the display mode of the data processing function is selected.
Figure 28:
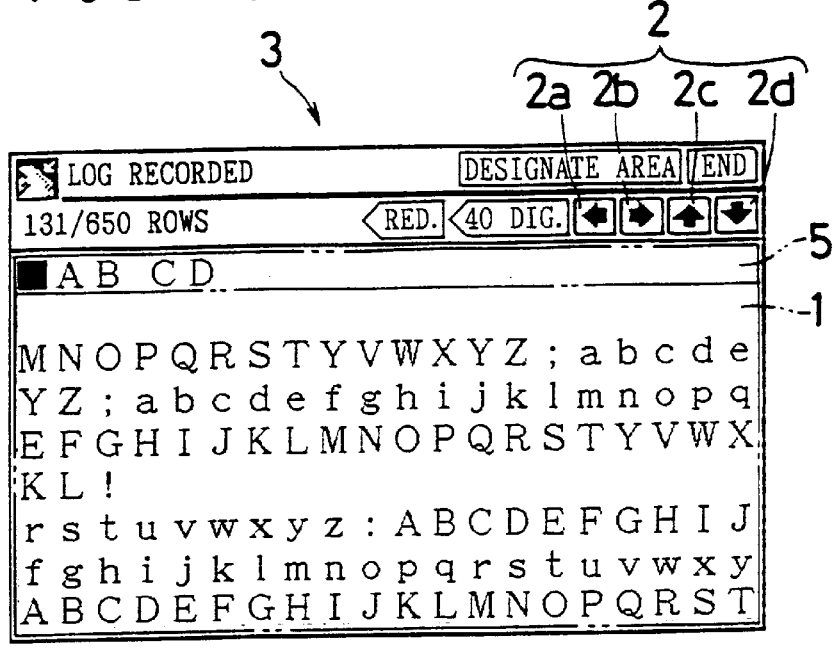
FIG. 28 shows a display image which includes an image and a cursor key for visually displaying data which are displayed in an apparatus according to a first conventional technique.
Figure 29:
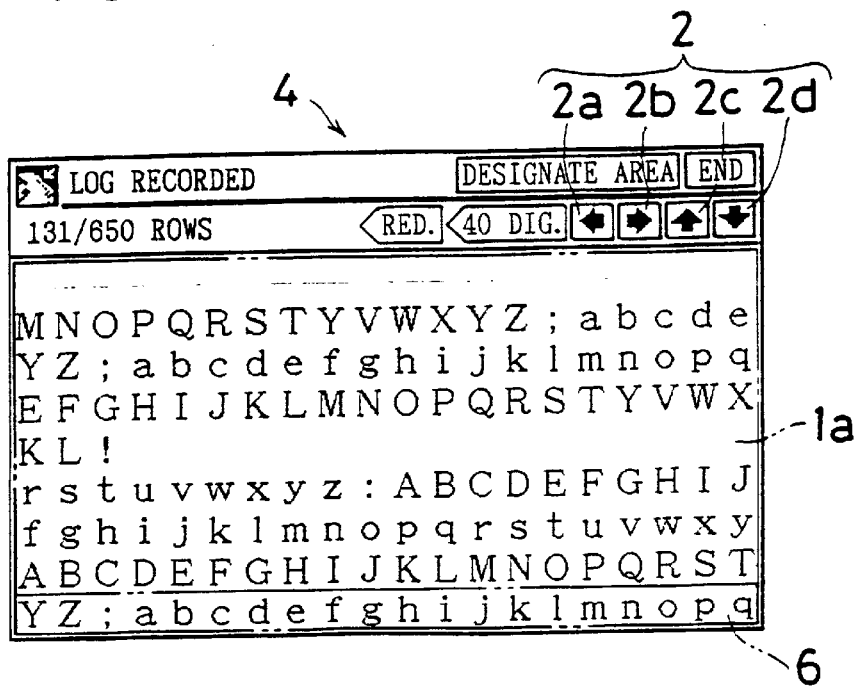
FIG. 29 shows a display image which is displayed when scrolling of one row to below from a condition where the display image is displayed is instructed.
Figure 30:
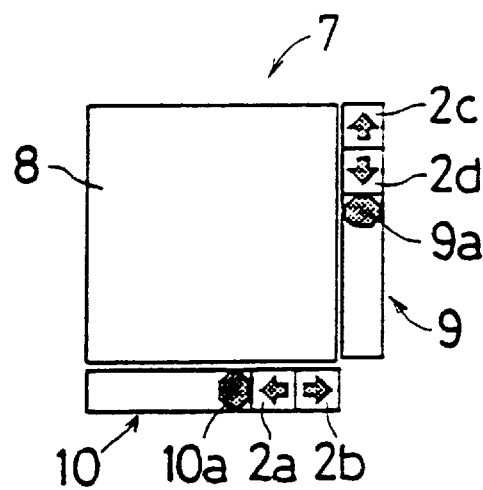
FIG. 30 shows a display image which includes an image and designation areas.

FIG. 27 is a flow chart for describing scrolling of an image which is executed in the electric device mentioned above, in a condition where the display mode of the data processing function is displayed. The flow chart in FIG. 27 is similar to the flow charts in FIGS. 10, 20 to 22, and 26 and therefore, identical reference numerals are assigned to steps at which identical operations are performed. A detailed description will be simply omitted.

When the data processing mode key of the mode key group is operated in the electric device and the display mode is selected, the sequence proceeds to the step a2 from a step v1. When at the steps a2 to a4 the inputted coordinates are judged to be of a designate point, the sequence proceeds to the step e2. At the steps e2 to a5, continuous scrolling is executed and is suspended for a wait time in accordance with the number of times of scrolling.

After the wait time has elapsed, the sequence proceeds to the step a5 to calculate a positional deviation of the designate point from the reference point. Upon calculation of the positional deviation, the sequence proceeds to the step f2 to calculate an approximate value of the positional deviation based on the flow charts in FIGS. 24 and 25. Upon calculation of the approximate value, the display start address A1 is corrected at the step a6 using the approximate value as the positional deviation. Based on the corrected display start address A1, at the step a7 data displayed in the scroll area 84 are rewritten. Upon rewriting of the data, at the steps f2 to f4 the second wait time t2 is shortened by the subtraction time tα. The sequence then returns to the step a2.

When the inputted coordinates are not of a designate point, at the step a8 whether the end button is operated is judged. When the end button is operated, the operation in this flow chart is ended at the step v2. When the end button is not operated, after performing other processing at the step a9 based on the inputted coordinates, the operation in this flow chart is ended at the step v2.

As described above, during continuous scrolling, it is possible to approximate a positional deviation of the designate point from the reference point to integer-multiples of the widths of the unit display region 149. It is also possible to prevent shifting of the display position of a character during scrolling and to improve the speed of scrolling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data processing apparatus comprising:

a memory for storing data of an image as image data to be visually displayed;

displaying means which includes a visual display region for visually displaying the image data stored in the memory, the visual display region being smaller than a virtual display region of the image data and at least partially overlapping the virtual display region;

designating means for designating one point of the image data displayed within the visual display region of the displaying means as a designate position;

computing means for calculating a positional deviation of the designate position designated by the designating means from a reference position predetermined within the visual display region, in response to an output from the designating means; and image moving means for scrolling the data of the image which is displayed in the visual display region, in response to an output from the computing means so that the positional deviation is substantially eliminated, and having the displaying means display the image in the visual display region.

2. The data processing apparatus of claim 1, wherein setting of the reference position and designation of the designate position are conducted using two-dimensional coordinates which are defined by two orthogonal axes which are shown in the visual display region; and the computing means arithmetically determines the positional deviation of the designate position from the reference position by computing differences in value between the two-dimensional coordinates of the reference position and the designate position corresponding to the respective coordinate axes.

3. The data processing apparatus of claim 1, wherein the image data to be visually displayed includes a character image, setting of the reference position and designation of the designate position are conducted using two-dimensional coordinates which are defined by two orthogonal coordinate axes which are shown in the visual display region, and the computing means includes:

deviation calculating means for calculating deviations of the designate position from the reference position in coordinate values corresponding to the respective coordinate axes; and approximate value calculating means for arithmetically determining the positional deviation by calculating approximate values of the deviations as an integer-multiple of widths of a predetermined rectangular region in the coordinate axis directions, the predetermined rectangular region containing the character image.

4. The data processing apparatus of claim 1, the data processing apparatus further comprising:

data inputting means for storing data which are inputted on the basis of a designate position within the visual display region into the memory;

mode switching means for selectively switching and setting a display mode which allows scrolling of an image and an inputting mode which allows entry of data; and control means for supplying the designate position from the designating means to the computing means and causing the computing means to determine the positional deviation when the display mode is set, the control means causing the data inputting means to input data based on the designate position within the visual display region when the inputting mode is set.

5. The data processing apparatus of claim 1, wherein the designating means can continuously designate designate positions, the data processing apparatus further comprising: judging means for judging at predetermined time intervals whether a position is designated by the designating means; and control means for supplying an output from the designating means to the computing means when the judging means judges that a position is designated, in response to the output from the designating means.

6. The data processing apparatus of claim 5, wherein the judging means judges that the designate position is designated over a successive plurality of the predetermined time intervals and then, shortens the predetermined time intervals every time a designate position is designated.

7. The data processing apparatus of claim 1, further comprising reference position setting means for changing and setting the reference position to one point which is designated within the visual display region of the displaying means.

8. The data processing apparatus of claim 1, wherein the reference position is the center of the visual display region.

9. The data processing apparatus of claim 1, wherein the visual display region of the displaying means is almost flat, and the designating means is translucent and includes flat two-dimensional position detecting means which is positioned on the visual display region for receiving an input correlating to the designate position.

10. The data processing apparatus of claim 1, wherein when the designating means designates two points having different coordinates within a rectangular region of the virtual display region, the computing means determines an approximated positional deviation such that the two points maintain a positional relationship between the two points before and after the data of the image is scrolled.

11. A method for processing data, comprising the steps of:

(a) storing data of an image as image data to be visually displayed in a memory;

(b) visually displaying the image data stored in step (a) with a visual display region being smaller than a virtual display region of the image data and at least partially overlapping the virtual display region;

(c) designating one point of the image data displayed within the visual display region as a designate position;

(d) calculating a positional deviation of the designate position from a reference position predetermined within the visual display region, in response to an output from step (c);

(e) scrolling the data of the image which is displayed in the visual display region, in response to an output from step (d) so that the positional deviation is substantially eliminated; and (f) displaying the image in the visual display region.

12. The method of claim 11, further comprising using two-dimensional coordinates which are defined by two orthogonal axes which are shown in the visual display region when setting the reference position and designating the designate position; and arithmetically determining the positional deviation of the designate position from the reference position by computing differences in value between the two-dimensional coordinates of the reference position and the designate position corresponding to the respective coordinate axes.

13. The method of claim 11, wherein the image data to be visually displayed includes a character image, setting of the reference position and designation of the designate position are conducted using two-dimensional coordinates which are defined by two orthogonal coordinate axes which are shown in the visual display region, and step (d) includes:
calculating deviations of the designate position from the reference position in coordinate values corresponding to the respective coordinate axes; and
arithmetically determining the positional deviation by calculating approximate values of the deviations as an integer-multiple of widths of a predetermined rectangular region in the coordinate axis directions, the predetermined rectangular region containing the character image.

14. The method of claim 11, further comprising:
storing data which are inputted on the basis of a designate position within the visual display region into the memory;
selectively switching and setting a display mode which allows scrolling of an image and an inputting mode which allows entry of data;
supplying a designate position;
determining the positional deviation when the display mode is set; and
inputting data based on the designate position within the visual display region when the inputting mode is set.

15. The method of claim 11, further comprising:
(g) judging at predetermined time intervals whether a position is designated; and
supplying the designated position output from step (c) to step (d) when step (g) judges that a position has been designated.

16. The method of claim 15, wherein step (g) judges that the designate position is designated over a successive plurality of the predetermined time intervals, and then shortens the predetermined time intervals every time a designate position is designated.

17. The method of claim 11, further comprising changing and setting the reference position to one point which is designated within the visual display region.

18. The method of claim 11, wherein the reference position is the center of the visual display region.

19. The method of claim 11, wherein the visual display region is almost flat, and further comprises positioning a translucent flat two-dimensional position detector on the visual display region for receiving an input correlating to the designate position.

20. The method of claim 11, further comprising designating two points having different coordinates within a rectangular region of the virtual display region, and determining an approximated positional deviation wherein the two points maintain a positional relationship between the two points before and after the data of the image is scrolled.

21. A data processing apparatus comprising:
a memory for storing data of an image as image data to be visually displayed;
a displaying unit that includes a visual display region for visually displaying the image data stored in the memory, the visual display region being smaller than a virtual display region of the image data and at least partially overlapping the virtual display region;
a designating unit that designates one point of the image data displayed within the visual display region of the displaying unit as a designate position;
a computing unit that calculates a positional deviation of the designate position designated by the designating unit from a reference position predetermined within the visual display region, in response to an output from the designating unit; and
an image moving unit that scrolls the data of the image which is displayed in the visual display region, in response to an output from the computing unit so that the positional deviation is substantially eliminated, and having the displaying unit display the image in the visual display region.

22. A data processing apparatus comprising:
a memory for storing data of an image as image data to be visually displayed;
displaying means including a substantially flat visual display region for visually displaying the image data stored in the memory, the visual display region being smaller than a virtual display region of the image data and at least partially overlapping the virtual display region;
designating means for designating a point at the visual display region of the displaying means as a designate position having a corresponding image portion of the image data, wherein the designating means is translucent and includes two-dimensional position detecting means spread across the visual display region for detecting the point;
supplying means for supplying the designate position to the computing means;
computing means for calculating a positional deviation of the designate position from a reference position predetermined within the visual display region; and
image moving means for scrolling the image portion of the image data displayed in the visual display region to the reference position based on the designate position supplied to the computing means and in response to an output from the computing means, wherein the displaying means displays the scrolled image in the visual display region.

23. The data processing apparatus of claim 22, further comprising:
judging means for judging at predetermined time intervals whether a position is designated by the designating means; and
control means for supplying an output from the designating means to the computing means when the judging means judges that a position is designated, in response to the output from the designating means.

* * * * *